United States Patent
Maker et al.

(10) Patent No.: US 10,623,406 B2
(45) Date of Patent: Apr. 14, 2020

(54) ACCESS AUTHENTICATION FOR CLOUD-BASED SHARED CONTENT

(71) Applicant: Box, Inc., Redwood City, CA (US)

(72) Inventors: Varun Maker, San Francisco, CA (US); Aniket Shivajirao Patil, Milpitas, CA (US); Reshma Ananthakrishnan, Menlo Park, CA (US); Drew Branden, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 146 days.

(21) Appl. No.: 15/656,943

(22) Filed: Jul. 21, 2017

(65) Prior Publication Data

US 2018/0026984 A1    Jan. 25, 2018

Related U.S. Application Data

(60) Provisional application No. 62/365,965, filed on Jul. 22, 2016.

(51) Int. Cl.
*H04L 29/06* (2006.01)
*H04L 29/08* (2006.01)

(52) U.S. Cl.
CPC ........ *H04L 63/0884* (2013.01); *H04L 63/083* (2013.01); *H04L 63/102* (2013.01); *H04L 67/10* (2013.01)

(58) Field of Classification Search
CPC . H04L 63/0884; H04L 63/083; H04L 63/102; H04L 67/10
See application file for complete search history.

(56) References Cited

U.S. PATENT DOCUMENTS

| 6,697,806 B1* | 2/2004 | Cook ................. G06F 21/31 |
| 2011/0153727 A1* | 6/2011 | Li ..................... G06F 9/5055 709/203 |

(Continued)

FOREIGN PATENT DOCUMENTS

| WO | WO 2015/188320 | * 12/2015 | ............. G06F 15/16 |

OTHER PUBLICATIONS

Rafael Moreno-Vozmediano, Rubén S. Montero, and Ignacio M. Llorente "IaaS Cloud Architecture: From Virtualized Datacenters to Federated Cloud Infrastructures" , 2012, IEEE, pp. 65-72 (Year: 2012).*

*Primary Examiner* — Catherine Thiaw
(74) *Attorney, Agent, or Firm* — Vista IP Law Group, LLP

(57) ABSTRACT

Systems for managing content in a cloud-based service platform. Embodiments operate using a server in a cloud-based environment. The server is configured to interface with one or more storage devices that store content objects. The server is further configured to carry out a protocol between the server and a user interface that supports access to the storage devices. In example configurations, the server is capable of processing at least three different access requests types that are raised from a user interface. A first access type corresponds to an access request type by a registered user. A second access type corresponds to an access request type to permit an application that is invoked by operation of the user interface to be run on the server and to produce further content objects. A third access type corresponds to an access request type that uses an inherited user profile to run a microservice.

21 Claims, 19 Drawing Sheets

(56) References Cited

U.S. PATENT DOCUMENTS

| | | | | |
|---|---|---|---|---|
| 2012/0110055 A1* | 5/2012 | Van Biljon | ............ | G06Q 30/04 |
| | | | | 709/201 |
| 2014/0082071 A1* | 3/2014 | Rexer | ............... | H04L 29/08666 |
| | | | | 709/204 |
| 2014/0278754 A1* | 9/2014 | Cronin | ................ | G06Q 30/0201 |
| | | | | 705/7.29 |
| 2015/0254450 A1* | 9/2015 | Ravi | ....................... | G06F 21/41 |
| | | | | 726/8 |
| 2016/0065417 A1* | 3/2016 | Sapuram | ............ | G06Q 30/0631 |
| | | | | 709/223 |
| 2016/0065555 A1 | 3/2016 | Branden et al. | | |
| 2017/0006118 A1* | 1/2017 | Dennis | .................... | H04L 41/22 |
| 2017/0111383 A1* | 4/2017 | Most | ........................ | H04L 63/08 |
| 2017/0155639 A1* | 6/2017 | Hu | ....................... | H04L 67/1097 |
| 2017/0289173 A1* | 10/2017 | Resch | ................... | G06F 3/0659 |
| 2018/0026984 A1 | 1/2018 | Maker et al. | | |
| 2018/0067903 A1 | 3/2018 | Maker et al. | | |

\* cited by examiner

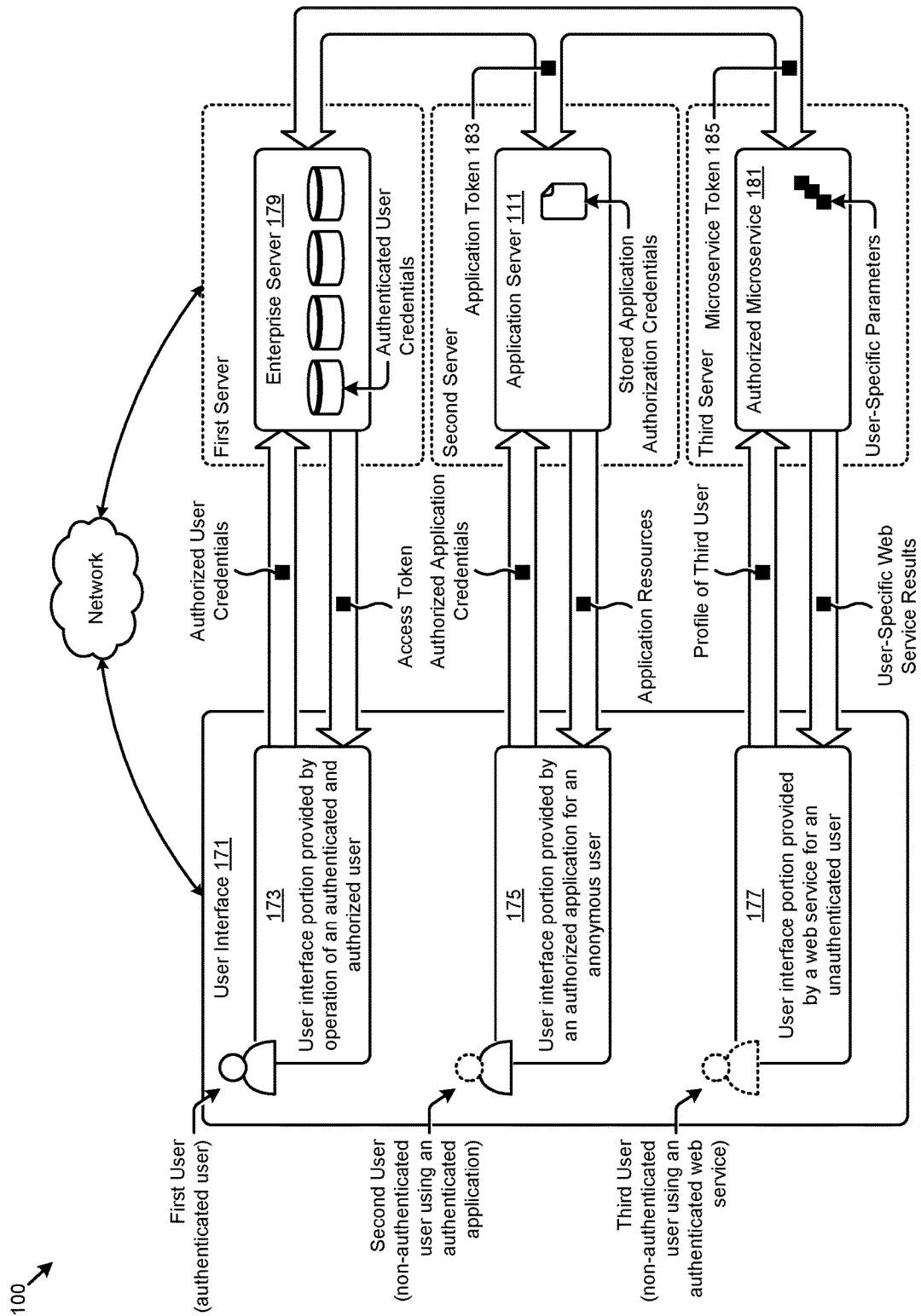
FIG. 1A1

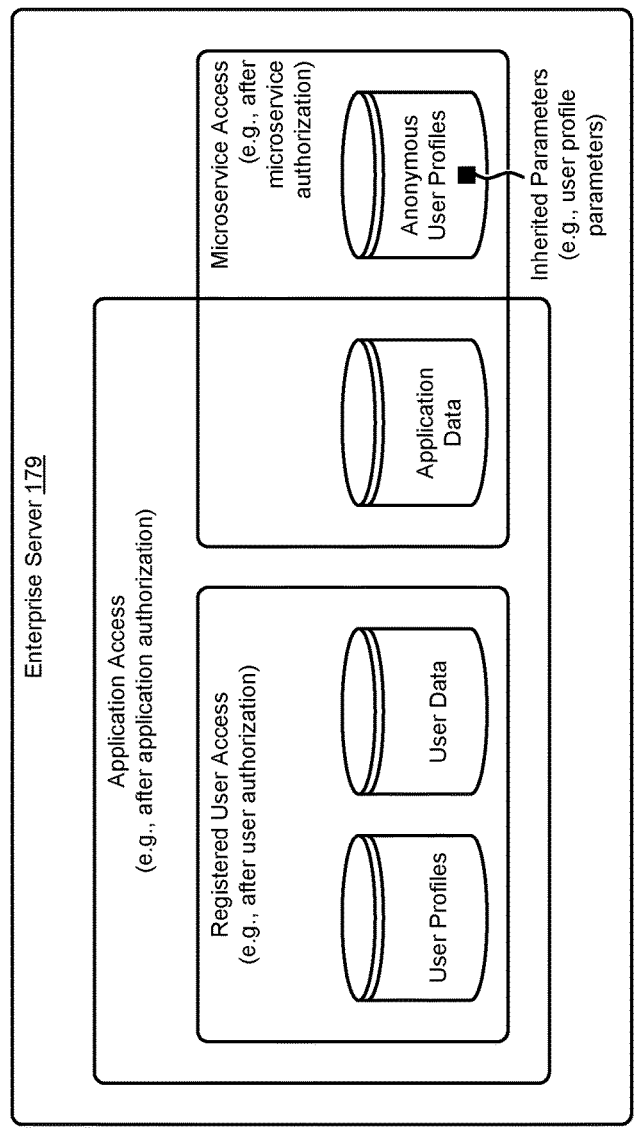
FIG. 1A2

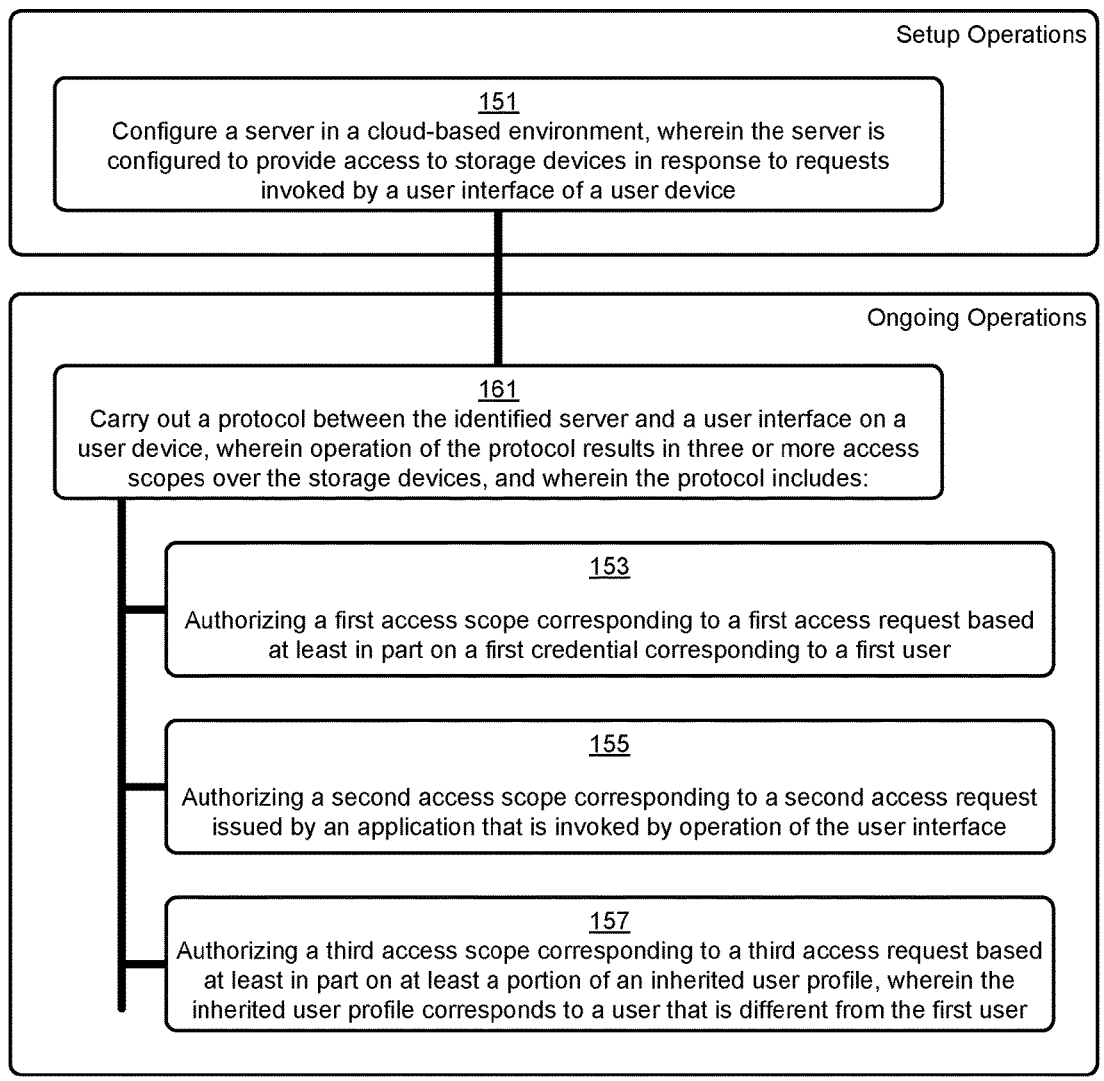
FIG. 1B1

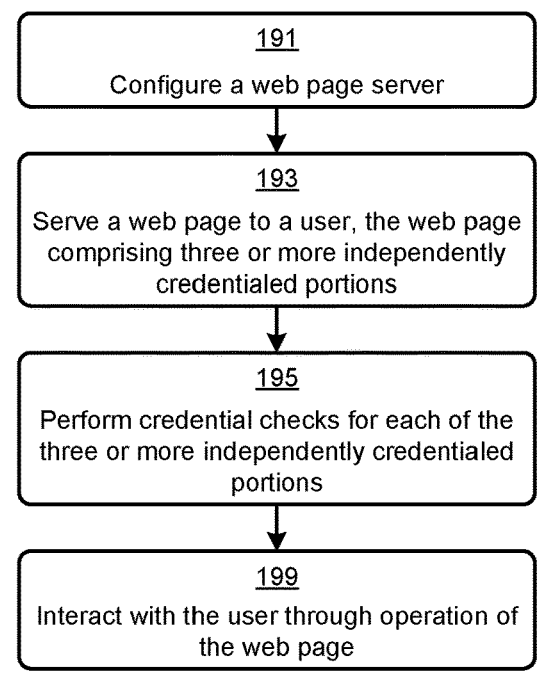
FIG. 1B2

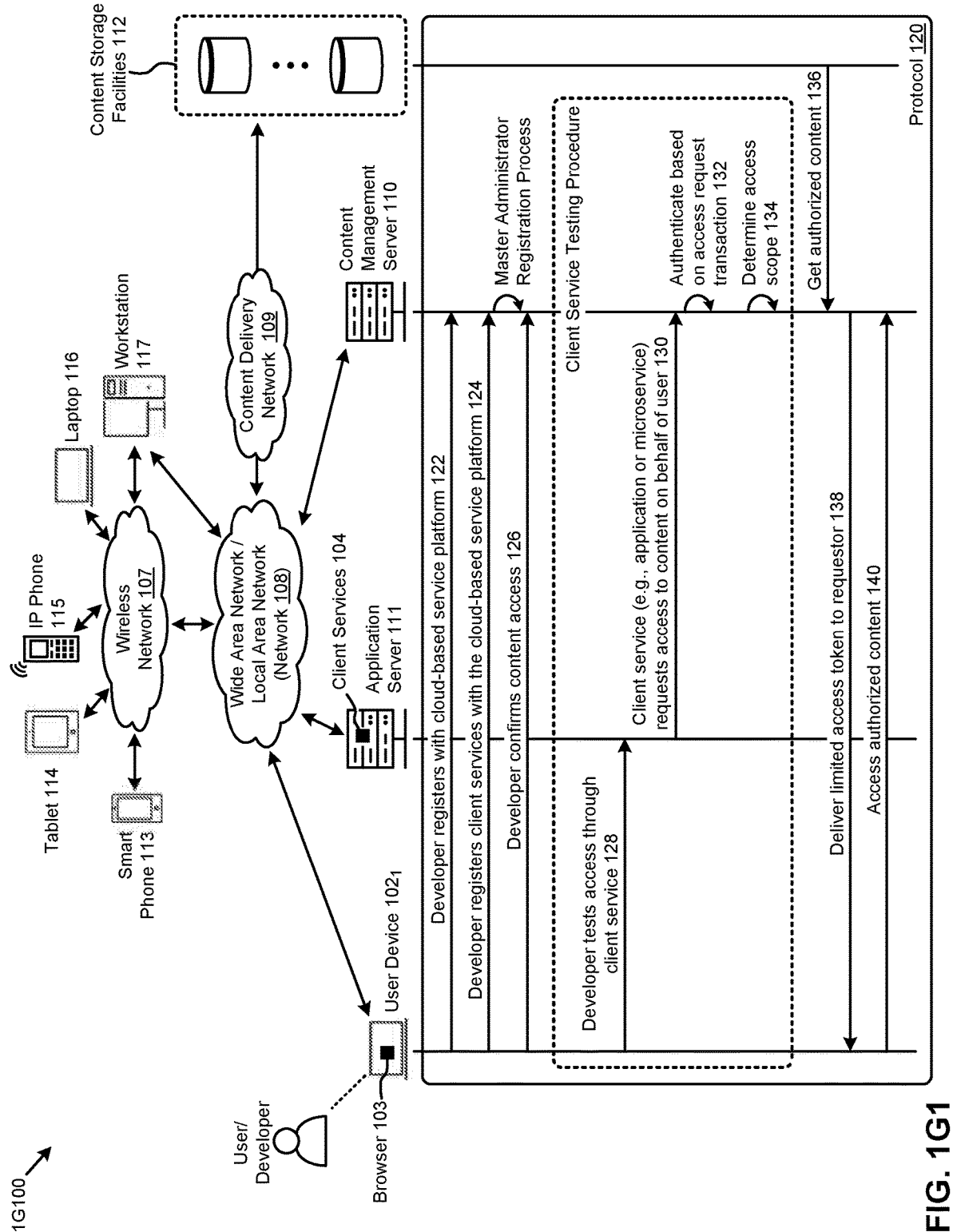
FIG. 1G1

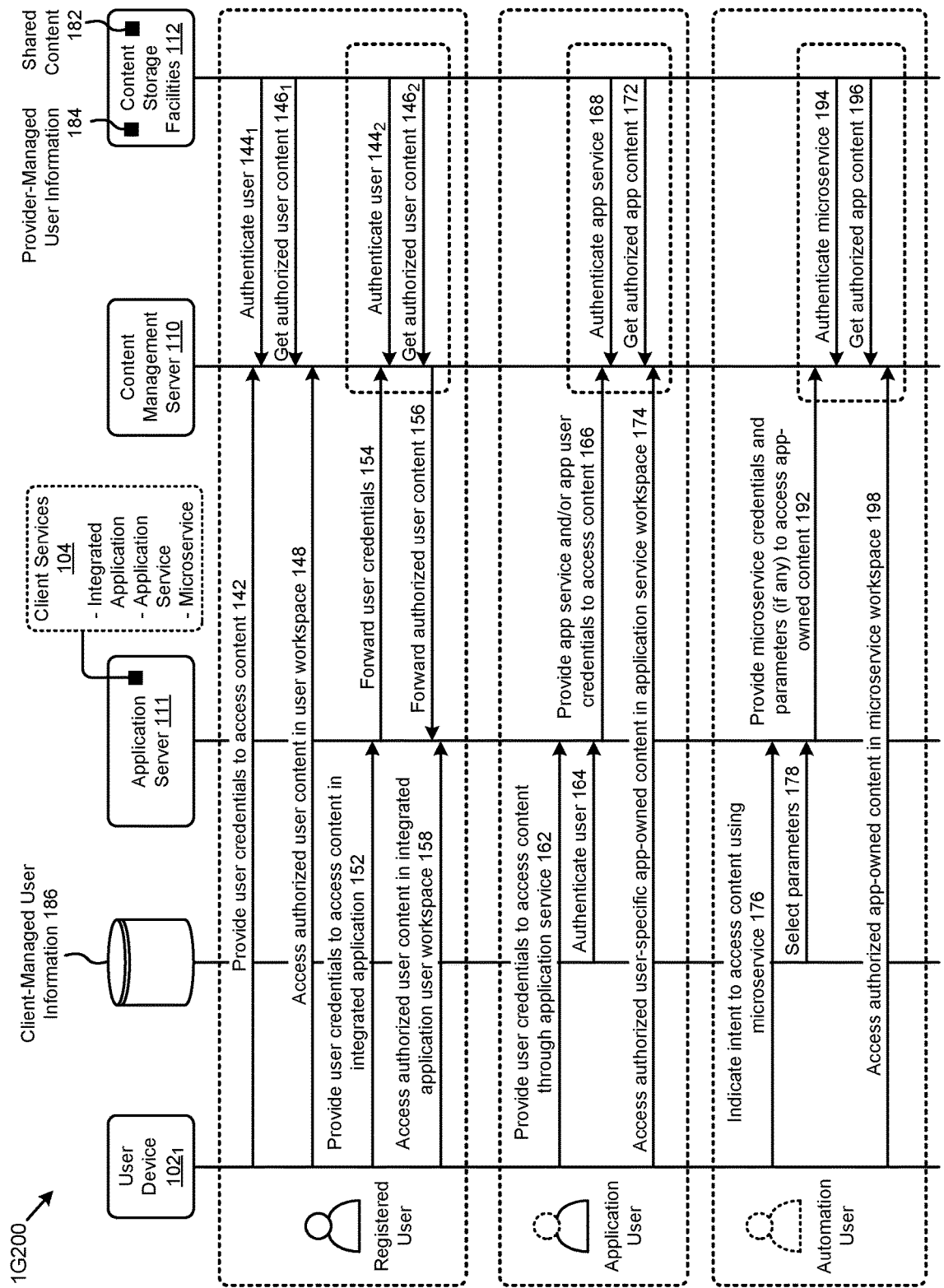
FIG. 1G2

ACCESS AUTHENTICATION FOR CLOUD-BASED SHARED CONTENT

RELATED APPLICATIONS

The present application claims the benefit of priority to U.S. Provisional Patent Application Ser. No. 62/365,965 titled "TRANSACTIONAL ACCESS AUTHENTICATION FOR CLOUD-BASED SHARED CONTENT", filed Jul. 22, 2016, which is hereby incorporated by reference for all purpose in its entirety.

FIELD

This disclosure relates to managing content in a cloud-based service platform, and more particularly to techniques for supporting user interfaces that use multiple different authentication techniques.

BACKGROUND

Proliferation of cloud-based content management services and rapid adoption of cloud-based collaboration have impacted the way personal and corporate electronically stored information objects (e.g., files, images, videos, etc.) are stored, shared and managed. One benefit of using cloud-based service platforms is the ability to securely create and share large volumes of content among trusted collaborators. For example, a large enterprise (e.g., company, firm, etc.) with thousands of users (e.g., employees, customers, etc.) and many terabytes of content might use a cloud-based service platform to efficiently and securely facilitate content access to various individual users and/or collaborative groups of users. The users can have access to content that the users own (e.g., resulting from a user's own creation that had been uploaded to the cloud-based service platform, etc.) as well as to content shared with other users. The cloud-based service platform often implements collaboration components (e.g., preview generators, commenting tools, workflow tools, etc.) to facilitate content sharing.

To increase the utility of content sharing and to enrich user experiences, software applications and web services are developed and deployed. Such applications and web services interface with the cloud-based service platform resources using application program interfaces or APIs for access to various portions of the shared content. In certain settings and, in particular, when implementing certain types of applications (e.g., web applications, mobile applications and/or variations thereof), collaboration involved with respect to the shared content might include combinations of multiple users rather than a single user, some of which of the multiple users are content owners, and some of which multiple users are not content owners, but nevertheless need some ways (e.g., secure ways) to access portions of the shared content.

Unfortunately, legacy approaches that apply to web applications that provide access to shared content in a cloud-based service platform are insufficient. Specifically, some approaches might provision content access for a given first type of transaction (e.g., user file access) based on a successful authentication of a user (e.g., human) at the cloud-based service platform, however access to content other than that which is available by the authenticated user might be needed for carrying out a second type of transaction (e.g., system file access), which second type of transaction might apply to a second type of user. Legacy approaches introduce burdensome requirements (e.g., by requiring separate authentication protocols to be carried out for each transaction type). Such legacy techniques are deficient, at least because (1) the user is repeatedly challenged to provide a username and password or other credentials, and (2) a master administrator or similar such super-user would need to manage multiple sets of credentials for each supported type of transaction and/or for each separate type of user. In addition to the aforementioned burdens, the legacy approaches are wasteful, at least inasmuch as not all client services require user authentication in order to perform its functions, and therefore the authentication challenge is not only unneeded but also might negatively impact overall user experience and/or system performance. This situation is exacerbated with the advent of microservices (e.g., web services). Legacy approaches to providing such microservices fail in that they either are allowed or disallowed based on a binary "Yes/No" determination even though the particular microservice might be able to perform its functions in a customized manner even in absence of any form of user authentication.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for facilitating transactional access authentication for cloud-based shared content, which techniques advance the relevant technologies to address technological issues with legacy approaches. More specifically, the present disclosure provides a detailed description of techniques used in systems, methods, and in computer program products for facilitating transactional access authentication for access to cloud-based shared content. Certain embodiments are directed to technological solutions for implementing a flexible authentication scheme based at least in part on access scoping to facilitate secure provisioning of cloud-based shared content.

The disclosed embodiments modify and improve over legacy approaches. In particular, the herein-disclosed techniques provide technical solutions that address the technical problems attendant to dynamically provisioning client service access to shared content in a cloud-based platform based on the scope of the access request transaction. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance online collaboration as well as advances in various technical fields related to data storage and security thereto.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A1, FIG. 1A2, FIG. 1B1, FIG. 1B2, FIG. 1C, FIG. 1D, FIG. 1E, and FIG. 1F depict setup and use scenarios of a system that supports a flexible authentication scheme for accessing functions and content in a cloud-based service platform.

FIG. 1G1 depicts an environment that supports a flexible authentication scheme for accessing a cloud-based service platform, according to some embodiments.

FIG. 1G2 depicts a protocol implemented by system components for accessing a cloud-based service platform that facilitates transactional access authentication, according to some embodiments.

DETAILED DESCRIPTION

Figure 1C:
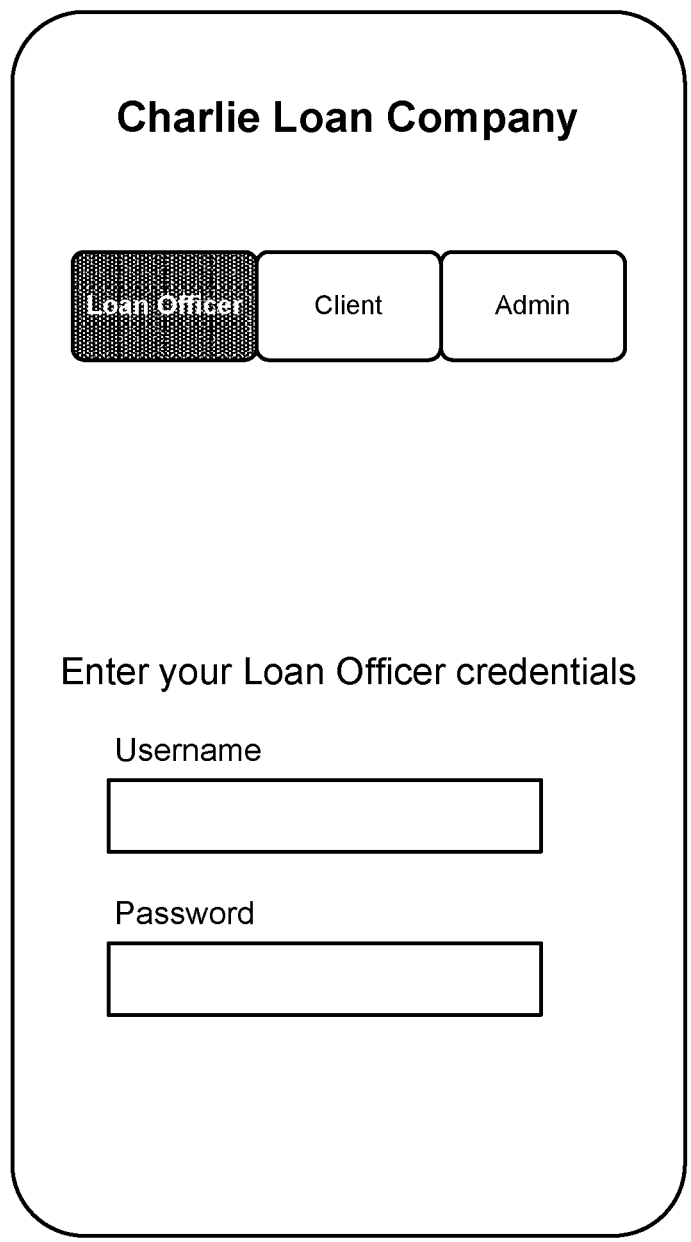

Embodiments of the present disclosure address the problem of provisioning user interfaces that support multiple types of client service access to content in a cloud-based platform. The disclosure includes approaches for implementing a flexible authentication scheme based at least in part on a client service scoping regime that facilitates provisioning of limited, secure access to cloud-based shared content by an unauthenticated user. Some embodiments are directed to approaches for securely implementing web services that return user-customized results that derive from characteristics of an unauthenticated user. The accompanying figures and discussions herein present example environments, systems, methods, and computer program products for facilitating transactional access authentication for cloud-based shared content.

Overview

Disclosed herein are techniques for implementing a flexible authentication scheme to facilitate access provisioning of cloud-based shared content in a user interface. Embodiments commence upon deploying a server in a cloud-based environment, such that the server is configured to interface with one or more storage devices that store shared content accessible over a network by two or more users. Various techniques are combined to implement a user interface that uses, (1) a user identifier associated with a registered, credentialed, and authenticable user; (2) an application service identifier associated with an authorized application; and (3) user information pertaining to an unauthenticated user, which user information is associated with an invocation of a microservice (e.g., a web service).

As discussed herein, a registered user may have a set of user credentials associated with authentication techniques that result in access to user-owned resources, whereas a microservice user might have no credentials, or might have credentials that are different and/or inaccessible from the user interface. A unique microservice token might be supplied from a trusted source for use as a proxy for a user credential. As used herein, a microservice is a function that has been authorized to access a specific set of resources to perform the function without use of authorization credentials of a calling user. The microservice itself is granted a limited scope of access to resources needed to perform the function, and can access the resources and/or produce resources on behalf of a calling unauthenticated user. Resources produced by the microservice can be specific to the invoking user and, in some cases, a call to the microservice comprises user profile information or portions thereof even though the calling user is unauthenticated.

As such, the aforementioned user interface supports formation of access requests that are received from a registered, authenticated user (e.g., for access to user-owned resources) and from an unauthenticated user (e.g., for access to resources that are accessible by a registered application or registered microservice). Requests comprise various combinations of the foregoing identifiers and/or credentials that are used to authorize the operation, possibly including access to resources that are not owned by the registered user. Authorization (e.g., using a limited scope token) for access to a particular location or within the span of a particular scope is associated with a respective access request. In certain embodiments, an access request invoked from an application or microservice can be satisfied based on a prior registration and authorization of the application or microservice. In such cases, the request is processed based at least in part on characteristics of the requestor. Such characteristics can be derived from a user profile, or from information pertaining to the registered application, or from information pertaining to a "foreign" user (e.g., in absence of user authentication). In some embodiments, when a limited access scope is authorized to an application or microservice, a limited access token is generated and, for a limited period of time, the application or microservice is granted access rights. Using the limited access token, the unauthenticated user is able to access outputs from the microservice.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

Figure 1D:
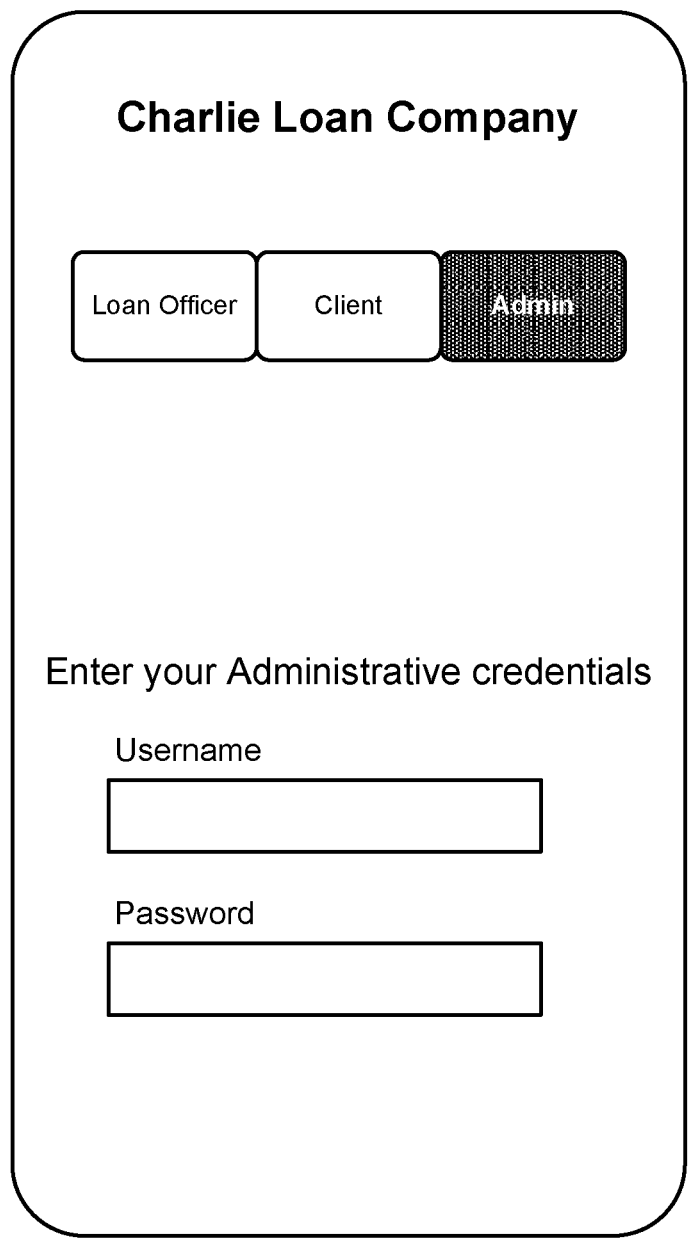
Figure 1E:
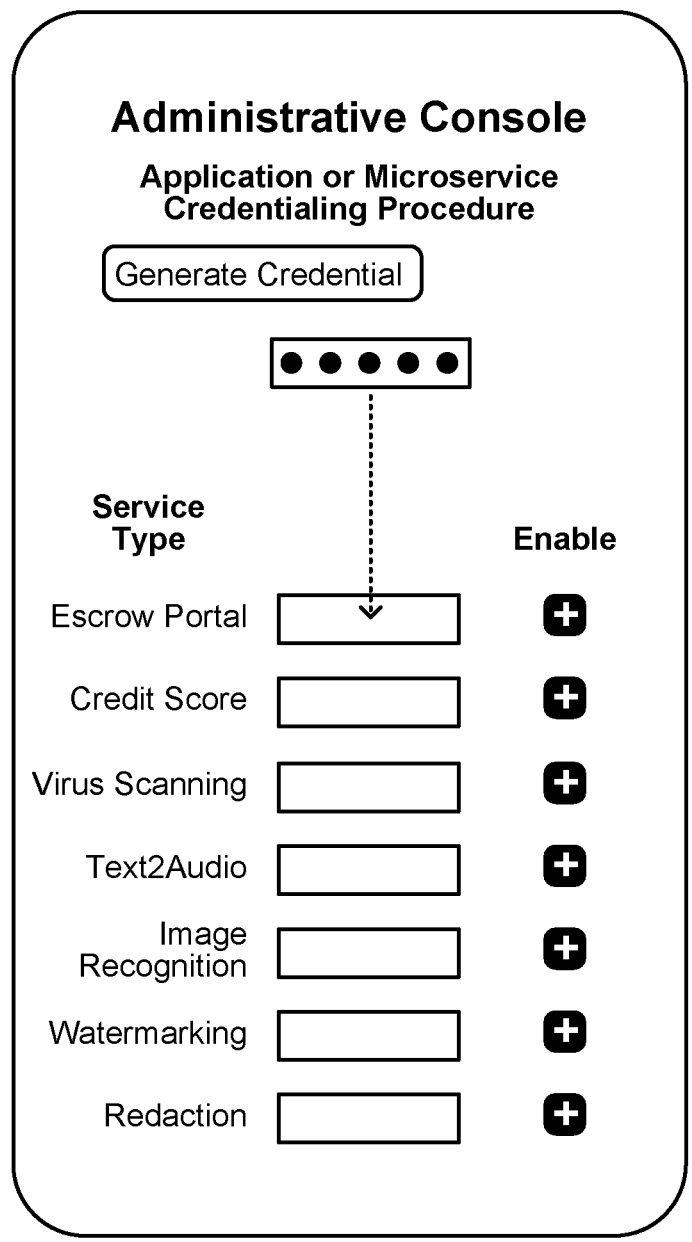
Figure 1F:
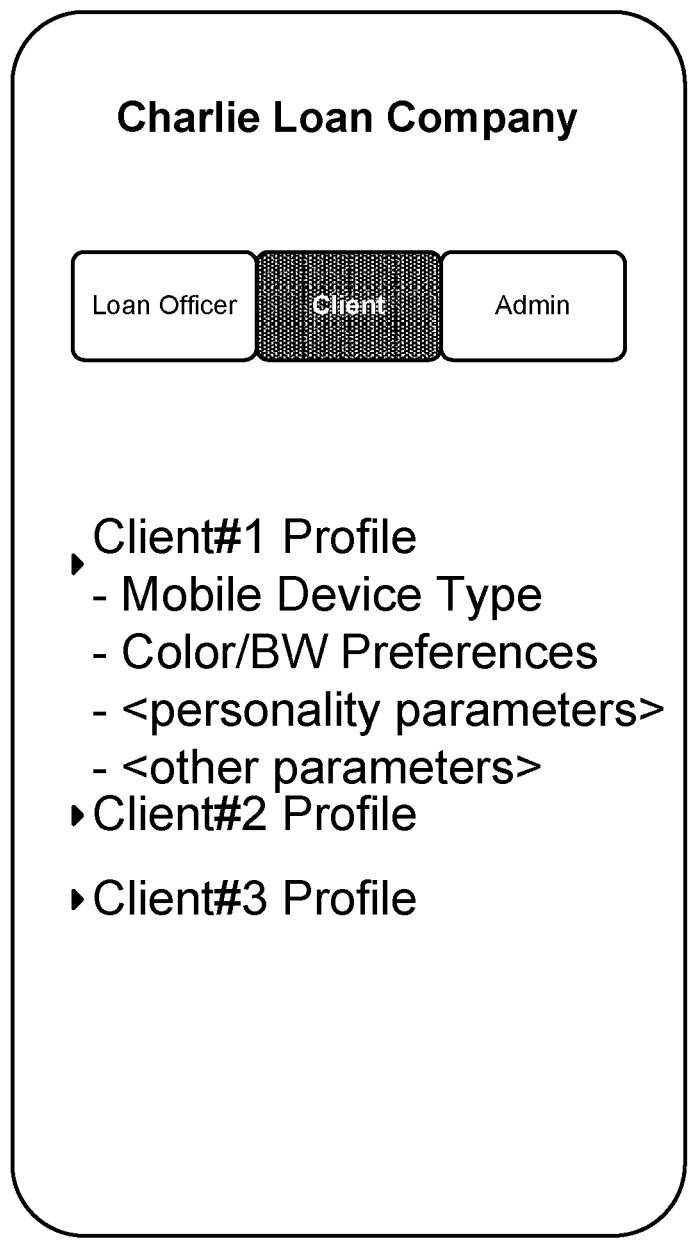

FIG. 1A1 through FIG. 1F depict setup and use scenarios of a system that supports a flexible authentication scheme for accessing functions and content in a cloud-based service platform. The depiction of the system 100 in FIG. 1A1 includes an enterprise server 179 that interacts with a user interface 171. The user interface is displayed to the shown first user. The first user interacts through a first portion of the user interface (e.g., first user interface portion 173) with the enterprise server. Authorized user credentials provided by the first user are sent to the enterprise server and verified against stored user credentials that are maintained by the enterprise server. Upon verification, the first user is deemed to be authenticated and an access token or other grant is delivered to the requesting first user.

The user interface also includes a second user interface portion 175, which second user interface portion interacts with an application server 111. During operation of the second user interface portion 175, no user credentials are exchanged. Even though no user credentials are exchanged during operation of the second user interface portion 175, the referenced application is granted access to resources needed by the application. Such resources might exist at the enterprise server 179 (as shown) or might exist elsewhere. An application token 183 is generated by the enterprise server 179 for access to the resources at the enterprise server. As needed (e.g., upon demand from the second user interface portion), application resources of portions therefrom are accessed using the application token. Derivatives therefrom are delivered to the second user interface portion 175.

Yet another portion of the user interface (e.g., a third user interface portion 177) serves to display or access information, which information derives from a network call from the user interface to an authorized microservice 181. Neither the network call nor the web service itself comprise any user credential, although the network call might include parameters derived from a third user's profile. The network call and its response from the web service are performed in absence of any information pertaining to the first user. In this example case, and as shown, information derived from a profile of the third user is delivered to the web service via the network call. As such, the web service returns user-specific web service results, the user-specific nature of the returned results pertaining to operation of the web service using a set of parameters that were derived from the profile of the third user. Access to resources of the enterprise server (if needed by the web service) is granted using the microservice token 185.

The foregoing system 100 supports the scenario where a fully-credentialed enterprise user (e.g., a bank loan officer) needs to access a full range of enterprise-owned resources (e.g., his or her files) while, at the same time, operating a trusted application (e.g., a communication portal to an escrow company) and while, at the same time, viewing results of a web service (e.g., real-time access to a credit score of a loan applicant).

FIG. 1A2 depicts several access scopes that depend on corresponding access request types. As shown, there are three different access scopes, which scopes correspond to (1) access to a first set of resources by a fully-credentialed enterprise user (e.g., registered user access), (2) access to a second set of resources by a trusted application (e.g., application access), and (3) access to a third set of resources by a microservice (e.g., microservice access). In the first scope, where access is provided to the first set of resources by a fully-credentialed enterprise user, the resources might include user profiles (e.g., system files with stored user credentials) as well as user data (e.g., user-owned data). In the second scope, access is provided to a second set of resources by a trusted application (e.g., derived from an application running on an enterprise server). Access to the second set of resources is enabled by a registration procedure that authenticates a master administrator, after which the application is authorized for access to the second set of resources. As regards to the third scope, access to the third set of resources by a microservice is also enabled by a registration procedure that authenticates a master administrator, after which the microservice is authorized for access to the third set of resources.

Access to any of the resources within the corresponding three scopes is provided through respective three independent operations. One possible embodiment of a system that implements such independent operations is given in FIG. 1B1.

FIG. 1B1 is a flowchart 1B100 that depicts deployment and operation of a user interface that has three independently credentialed portions. As shown, setup operations are initiated to configure a server in a cloud-based environment, wherein the server is configured to provide access to storage devices in response to requests invoked by a user interface of a user device (step 151). A user device implements a user interface that is configured to carry out a protocol with the identified server. Operation of the protocol results in three or more access scopes over the storage devices (step 161). The protocol includes steps for: authorizing a first access scope corresponding to a first access request based at least in part on at least a portion of first credentials corresponding to a first user (step 153), authorizing a second access scope corresponding to a second access request for running an application that is invoked by operation of the user interface (step 155), and authorizing a third access scope corresponding to a third access request based at least in part on at least a portion of an inherited user profile, wherein the inherited user profile corresponds to a user that is different from the first user (step 157).

The aforementioned user interface can be any user interface that serves to receive and respond to user activities on the user device. Such a user interface might be implemented as a mobile app, or as a web page. One embodiment of the user interface in the form of a web page served by a web server is shown and described as pertains to FIG. 1B2.

FIG. 1B2 is a flowchart 1B200 that depicts deployment and operation of a web server that serves a web page having three or more independently credentialed portions. The shown flow commences at step 191, whereupon a web page server is configured. At step 193, the configured web page server responds to a user device and serves a web page to the user of the user device. The served web page comprises three or more independently credentialed portions. During the course of interactions between the web server and the user device, three different credential checks are performed—one check for each of the three or more independently credentialed portions (step 195). The web server carries out further interactions (at step 199) to implement a range of functions facilitated by the web page.

The aforementioned web page might be a page of a web application, which web application in turn relies at least in part on the aforementioned three credentialing checks. Prior to deployment of such a web application, data structures are populated and secured for use in the aforementioned three credentialing checks. Specifically, such data structures might include registration data structures pertaining to an authorized user or registration data structures pertaining to an authorized application or microservice.

Techniques that support formation of registration data structures pertaining to an authorized user and techniques that support formation of registration data structures pertaining to an authorized application or microservice are given in the following FIG. 1C, FIG. 1D, and FIG. 1E. Techniques that support formation of data structures pertaining to operation of a microservice by an unauthorized user is given in FIG. 1F.

FIG. 1C depicts a user interface as might be used by a fully-credentialed user (e.g., a bank loan officer) for access to the full range of resources owned by or accessible to the fully-credentialed user. Continuing this example, the loan officer identifies his or her role as a loan officer (e.g., using the provided web user interface button), and enters credentials in the form of a username and password pair.

FIG. 1D depicts a user interface as might be used by a fully-credentialed administrative user (e.g., a master administrator or super user) for purposes of authorizing installation and invocation of an application and/or microservice such that the application can access certain sets of application programming interfaces or storage resources of the enterprise. Once the administrative credentials are verified, an administrative console is presented to the authenticated administrative user.

As shown in FIG. 1E, the administrative console includes a function to generate an application credential and/or a microservice credential. In this case, the application or microservice credential serves as an anonymous or inherited user token that can then be used to authorize access to certain sets of application programming interfaces or storage resources as may be needed for the installation and/or running of any executable, such as an escrow office communication portal, or a credit score application (e.g., to "update" and/or "pull" a credit score from a service for a particular person). For certain microservices, the information retrieved and/or the characteristics of the microservice and/or the user experience can be enhanced by providing the microservice sets of parameters that correspond to a particular user profile.

In some cases, and as shown in the example scenario of FIG. 1F, the user profile or portion thereof that is used in the microservice call is different than the authenticated bank officer. In this example, the bank officer might have access to some subset of the bank's client information, but not the credentials of the client. As such, the full set of client credentials cannot be provided to the microservice, and instead, a subset of client information (e.g., preferences and other profile parameters) is made accessible to the bank officer. The bank officer in turn can invoke microservices on behalf of the selected client, using the preferences and parameters of the selected client. As shown, "Client #1" has a particular type of mobile device, has "Color/BW" preferences, and has other information and/or parameters that are available to the bank officer (e.g., a social security number or portion thereof).

As earlier indicated, an application or microservice is pre-vetted by a master administrator. However, in advance of such pre-vetting by a master administrator, an application or microservice developer writes (i.e., develops) the application or microservice and registers it with the cloud-based service platform, possibly with approval processing performed by a master administrator. FIG. 1G1 depicts an example environment that supports protocol for registering and testing a client service capability in the form of an application or microservice.

FIG. 1G1 depicts an environment 1G100 that supports a flexible authentication scheme for accessing a cloud-based service platform. In accordance with the shown registration and testing scheme, a user/developer registers his or her self with the cloud-based service platform (message 122). The developer then registers a client services capability (e.g., an API or executable) with the cloud-based service platform (message 124). In a testing scenario, the developer can request content access (message 126) so as to confirm availability of (and access to) some specific content. Next, in this testing scenario, the developer tests access through the client service (message 128). Continuing into the application or microservice testing following this protocol 120, the client service issues a content access request to the cloud-based service platform (e.g., at content management server 110) on behalf of the user (message 130). The request is authenticated (message 132), an access scope is determined (message 134), accessible content is retrieved (message 136), and a token to the accessible content or derivative therefrom is delivered to the requestor (message 138). The user can interact further over the authorized content using the token (message 140).

The description of the foregoing example refers to merely a subset of the computing systems that might be included in an environment that supports the herein-disclosed flexible authentication techniques. Often many additional computing systems are in operation within the environment. FIG. 1G1 depicts an environment that interconnects various computing systems (e.g., servers and devices) that are interrelated for ongoing communications. As shown, the communications are implemented by a wireless network 107, a network 108, and a content delivery network 109. The wireless network 107, the network 108, and the content delivery network 109 can comprise any combination of a wide area network (e.g., WAN), local area network (e.g., LAN), cellular network, wireless LAN (e.g., WLAN), or any such means for enabling communication of computing systems. The wireless network 107, the network 108, and the content delivery network 109 can also collectively be referred to as the Internet. The content delivery network 109 can comprise any combination of a public network and a private network.

More specifically, environment 1G100 hosts a shared storage facility that comprises at least one instance of a content management server 110, at least one instance of an application server 111, and one or more content storage facilities (e.g., content storage facilities 112). The servers and storage facilities shown in environment 1G100 can represent any single computing system with dedicated hardware and software, multiple computing systems clustered together (e.g., a server farm), a portion of shared resources on one or more computing systems (e.g., virtual server), and/or any combination thereof. For example, the content management server 110 and the content storage facilities 112 can comprise a cloud-based content management platform that provides content management services (e.g., cloud-based service platform). Environment 1G100 further comprises an instance of a user device $102_1$ that can represent one of a variety of other computing devices (e.g., a smart phone 113, a tablet 114, an IP phone 115, a laptop 116, a workstation 117, etc.) having hardware and software (e.g., an application such as a browser 103) capable of processing and displaying information (e.g., web page, graphical user interface, etc.) and communicating information (e.g., web page request, user activity, electronic files, etc.) over the wireless network 107, the network 108, and/or the content delivery network 109. As shown, the user device $102_1$ can be operated by one or more users that desire to access certain content in the content storage facilities 112. As can be observed, the user device $102_1$ can be operated by one or more developers, which developers can develop instances of client services 104 to facilitate, in part, access to the shared content by the users. In some cases, the client services 104 can operate on one or more instances of the application server 111 and present a user interface (e.g., in browser 103) to facilitate user access.

The aforementioned limited access token is derived from the authorized microservice token. In this and other embodiments, the limited access token conveys access rights to the requestor such that the limited access token can only be used to access a specific content area that had been sequestered by the microservice. In some embodiments, the limited access token is timestamped or otherwise associated with a time of creation. It remains valid only for a certain amount of time, after which the token is deemed to have expired and cannot be used to access the specific content area that had been sequestered by the microservice.

Further details describing various access scopes facilitated by the herein disclosed techniques are shown and described as pertaining to FIG. 1G2.

FIG. 1G2 depicts a protocol 1G200 implemented by system components for accessing a cloud-based service platform that facilitates transactional access authentication. As an option, one or more instances of protocol 1G200 or any aspect thereof may be implemented in the context of the architecture and functionality of the embodiments described herein. The protocol 1G200 or any aspect thereof may be implemented in any desired environment.

In one embodiment, user device $102_1$, application server 111, content management server 110, and the content storage facilities 112 can exhibit a set of high-level interactions (e.g., operations, messages, etc.) in the protocol 1G200 for accessing a set of shared content 182. Various instances of client services 104 (e.g., integrated applications, application services, microservices, etc.) can operate on application server 111. Such client services can be given certain privilege grants to allow the client service to operate certain features of the cloud-based service platform. In some cases, privilege grants of a particular scope are granted to the client service by the enterprise, and in other cases, such privilege grants of a different scope are provided to the client service to operate on behalf of the enterprise and/or on behalf of authorized users of the client service. For example, a certain enterprise can establish an enterprise account with a cloud-based service provider and a given client service can have an access scope determined by the enterprise account.

As can be observed, protocol 1G200 is partitioned according to the role of the requesting user as perceived by the cloud-based service platform when performing the authentication and/or authorization to facilitate the requested content access. Specifically, for example, while an access request might be invoked by a human user at user device $102_1$, the herein disclosed approach and techniques can distinguish between a "registered user" (e.g., human user, managed user) accessing user-owned content directly or through an integrated application, an "application user" (e.g., "headless" user) accessing user-owned and/or enterprise-owned content through an application service, and an "automation user" (e.g., unknown user) accessing application-owned content through a microservice. Other combinations of user types, and/or combinations of access request types, and/or other types of client services are possible. Distinguishing among such combinations according to the herein disclosed techniques facilitates a flexible authentication scheme that can dynamically provision content access based at least in part on the scope of the client service.

For example, the registered user can provide a full set of user credentials to obtain access to the full scope of content provisioned to that particular user, while an automation user might merely represent an invocation of a particular microservice invoked by an unknown user (e.g., as compared to representing a human user) in order to obtain access to microservice functions and/or microservice outputs (e.g., preview versions of a file accessible by the microservice).

The application user can represent a human user in the context of an application service (e.g., enterprise application). Such application users can be referred to as headless users since a collection of application users can be provisioned access based at least in part on a common association with the application service. For example, the headless users might all be employees of Company ABC and use an application service developed by Company ABC.

As shown, a registered user at user device $102_1$ can provide user credentials (e.g., login with username and password) to access certain content (message 142). The user can be authenticated at content management server 110 using provider-managed user information 184 stored in the content storage facilities 112 (message 144₁). For example, a lookup of the user credentials in the provider-managed user information 184 can be used to provide an access token to the registered user. Certain other data (e.g., permissions, roles, etc.) from the provider-managed user information 184 can be used to get a set of authorized user content (e.g., user-owned content) associated with the registered user (message 146₁) for access by the registered user in a user workspace (message 148). The registered user can further access user-specific authorized content by providing the user credentials to an integrated application (message 152). Such integrated applications might comprise interactions directly with the file system of a cloud-based service platform. For example, the integrated application might use some of the APIs used internally by the cloud-based content management service provider. As such, integrated applications can be jointly developed by the enterprise and the provider. The integrated application can forward the received user credentials to content management server 110 (message 154) to authenticate the user and get the authorized user content as if the registered user directly requested the access (message 144₂ and message 146₂). The authorized user content can be forwarded to the integrated application at application server 111 (message 156) to present to the registered user (message 158).

In cases when the cloud-based service platform receives access requests as from an application user, a user at user device 102₁ can provide user credentials to an application service at application server 111 with an intent to access content related to the application (message 162). The user can be authenticated by the application service at application server 111 using a set of client-managed user information 186 (message 164). For example, client-managed user information 186 might comprise an active directory with data structures for mapping user credentials to unique application user identifiers (AIDs), which AIDs can further be mapped to various application service identifiers (ASIDs). In exemplary cases, no personally identifiable information related to the user at user device 102₁ (e.g., email address, password, etc.) is passed on the exchange between application server 111 and content management server 110.

In some cases, the application user role can have a user code or screen name attribute. The ASID and/or AID can be provided to the content management server (message 166) to invoke authentication of the requesting application service and/or the requesting application user (message 168). Such authentication might use provider-managed user information 184. The provider-managed user information 184 (e.g., user permissions, application service permissions, etc.) can further be used to determine the authorized content associated with the application service that can be accessed by the application user (message 172). Application-produced content (e.g., application-owned content) can then be accessed in an application service workspace by the user at user device 102₁ (message 174). In some cases, authorization can also enable certain features that can be passed to the associated application service, which can in turn be presented to the user upon access to the application-produced content. Features provided by the cloud-based service platform include but are not limited to auditing operations, collaboration tasks, comment features, workflow access, observation of sets of permissions, aspects of membership in groups, management and observance of retention policies, assignments of content-specific security parameters, and/or other features.

In cases when the cloud-based service platform receives access requests, such as from an automation user, a user at user device 102₁ can indicate an intent to access content using a microservice (message 176). For example, the user might merely launch an enterprise application within the enterprise intranet to invoke a preview of certain files (e.g., a home page dashboard). The microservice may select various parameters from the client-managed user information 186 (message 178) to issue with credentials (e.g., a unique identifier) associated with the microservice that are to be sent to the content management server 110 (message 192). For example, certain attributes pertaining to the initiating request (e.g., user device type, time of day, location, etc.) might be forwarded as parameters and/or used to select other parameters (e.g., user group, gender, age group, etc.) to include in the access request from the microservice. In some cases, merely the minimal parameters for executing the microservice operation (e.g., file identifiers for a file preview) can be provided to the cloud-based service platform so as to represent the user at user device 102₁ as an unknown user. The requesting microservice can be authenticated at content management server 110 (message 194). In this case, authentication can be performed with no use of provider-managed user information 184. Successful authentication can authorize (via message 196) access to microservice-produced content (e.g., microservice-owned content) that can be presented to the user at user device 102₁ in a microservice workspace area (message 198). Content in the microservice workspace can be aggressively managed (e.g., cleaned-up and/or deleted) whenever a requesting user (e.g., whether authenticated or not) ceases to carry out microservice-related messaging (e.g., after a timeout, or after the user moves to another task).

Figure 2A:
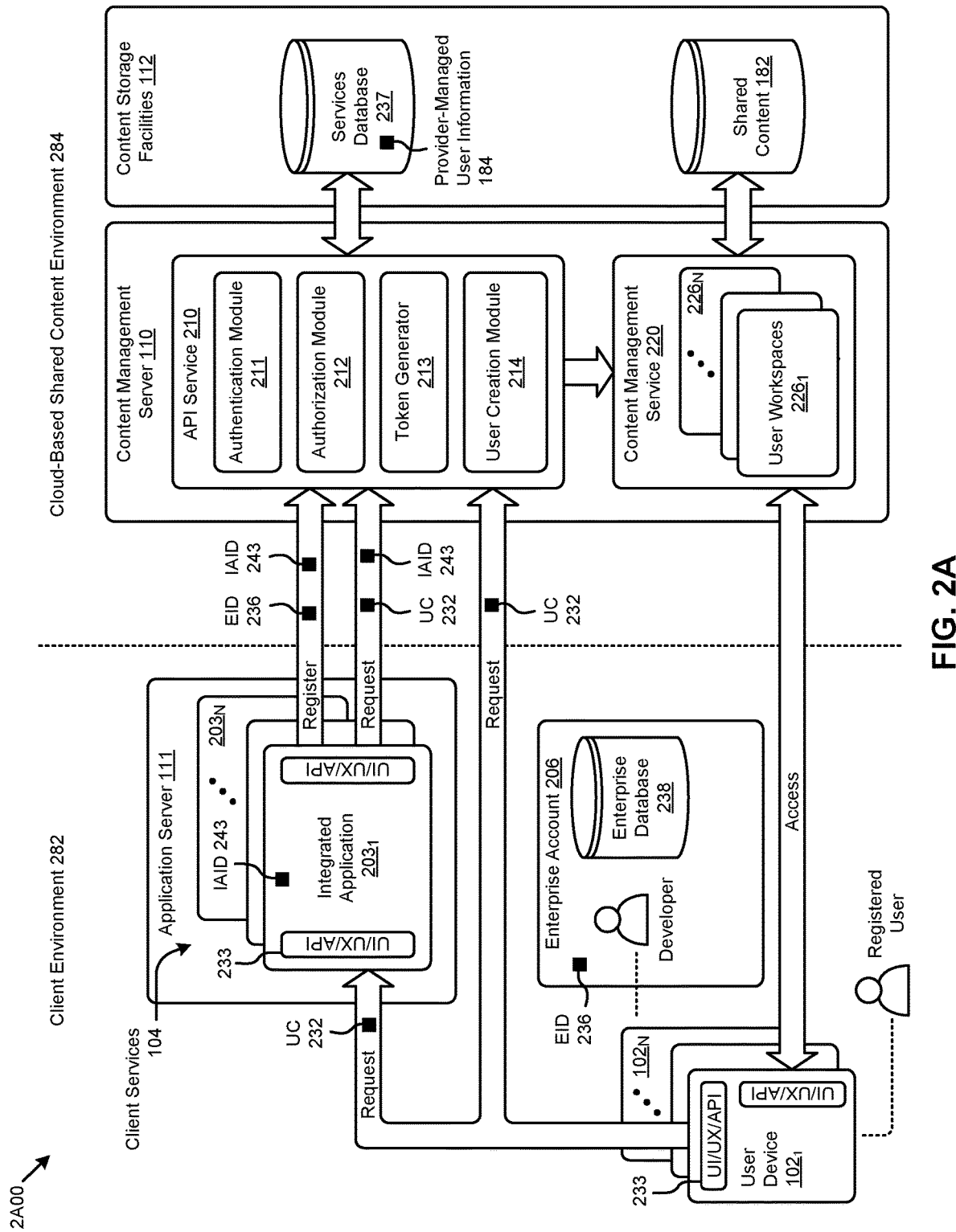
FIG. 2A presents a registered user authentication technique for accessing a cloud-based service platform that facilitates transactional access authentication, according to an embodiment.
Figure 2B:
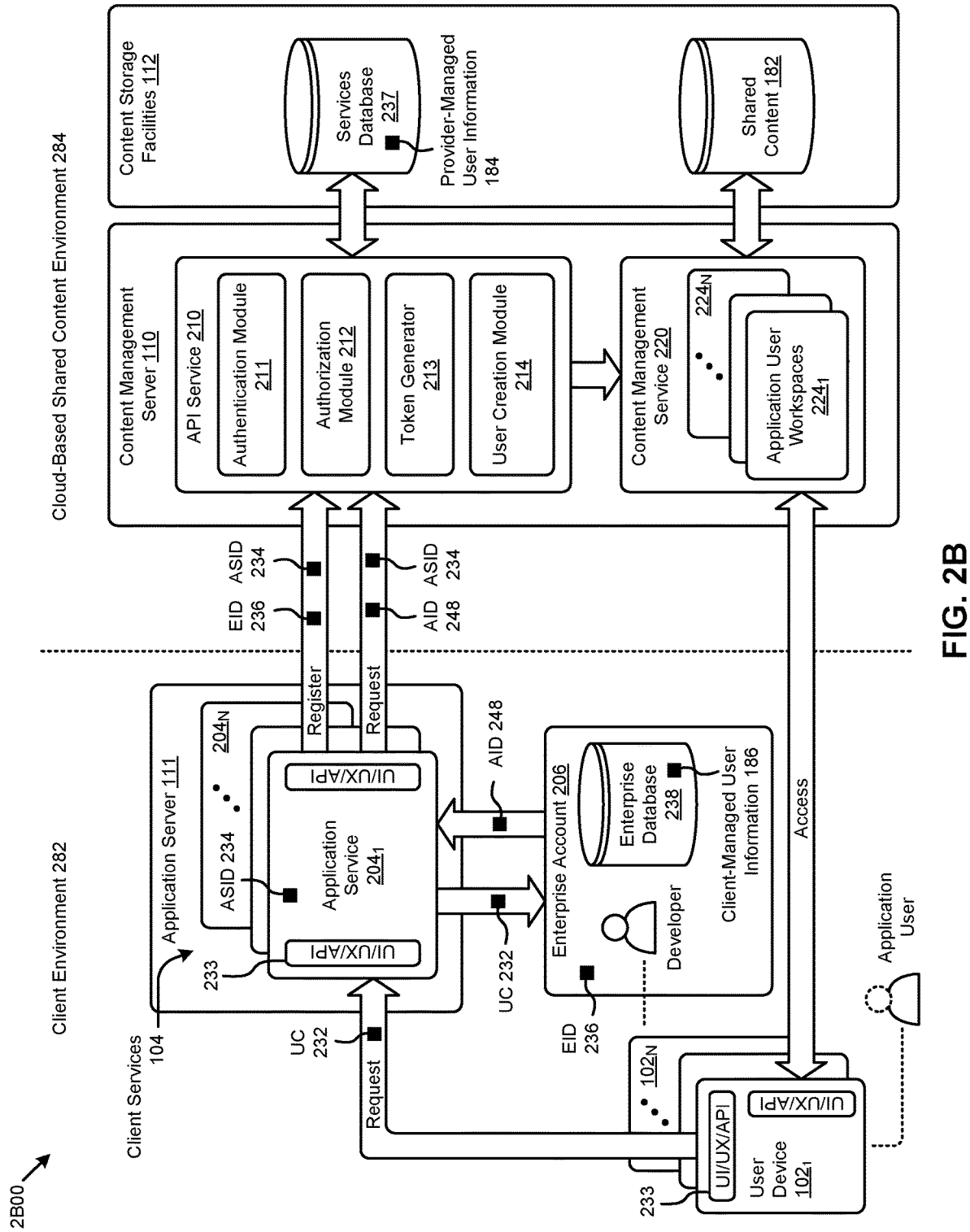
FIG. 2B presents an application user authentication technique for accessing a cloud-based service platform that facilitates transactional access authentication, according to an embodiment.
Figure 2C:
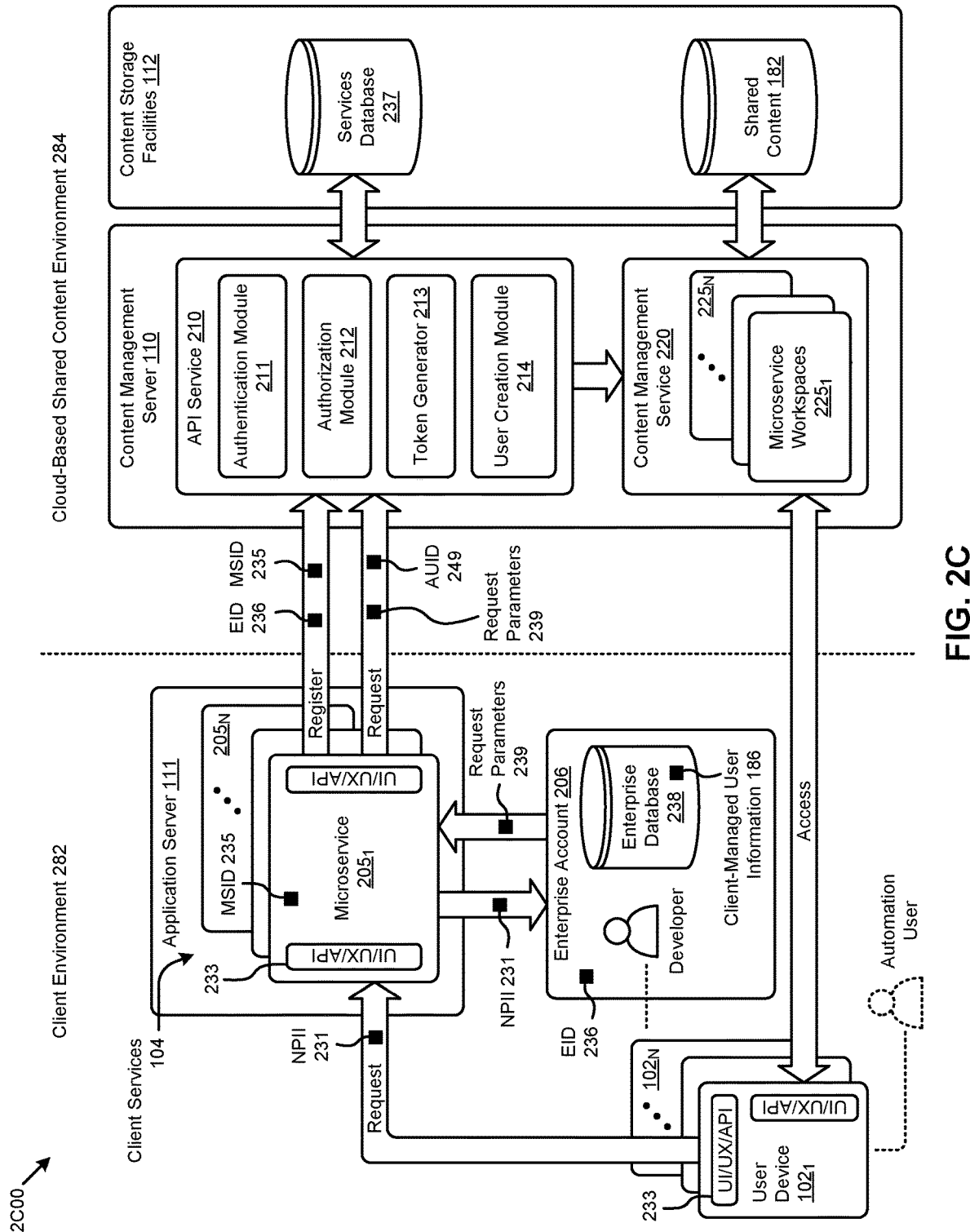
FIG. 2C presents an automation user authentication technique for accessing a cloud-based service platform that facilitates transactional access authentication, according to an embodiment.

Example embodiments of systems for implementing the foregoing scenarios according to the herein disclosed techniques are shown and described as pertaining to FIG. 2A, FIG. 2B, and FIG. 2C.

FIG. 2A presents a registered user authentication technique 2A00 for accessing a cloud-based service platform that facilitates transactional access authentication. As an option, one or more instances of registered user authentication technique 2A00 or any aspect thereof may be implemented in the context of the architecture and functionality of the embodiments described herein. The registered user authentication technique 2A00 or any aspect thereof may be implemented in any desired environment.

The registered user authentication technique 2A00 shown in FIG. 2A presents an example embodiment of various modules for implementing the herein disclosed techniques to facilitate cloud-based shared content access by a registered user. The embodiment includes one or more instances of content management server 110 that can access the content storage facilities 112 in a cloud-based shared content environment 284. Functions of the modules can be accessed by an application programming interface (API) and/or an API call can invoke services (e.g., API services). Specifically, content management server 110 can operate an API service 210 comprising an authentication module 211, an authorization module 212, a token generator 213, and a user creation module 214. The content management server 110 can also operate a content management service 220 comprising content access applications to access a plurality of user workspaces (e.g., user workspace 226₁, . . . , user workspace 226ₙ).

More specifically, the user workspaces managed by content management service 220 represent secure collections of shared content 182 (e.g., stored in the content storage facilities 112) accessible by a respective registered user. Content management service 220 uses the user workspaces, in part, to deliver various layers of content management capabilities to the registered users. Such content management capabilities include, but are not limited to, permissions and security, auditing and tracking, collaboration capabilities (e.g., commenting capabilities, task invocation capabilities, sharing capabilities, etc.), and other capabilities.

Also shown in client environment 282 is a representative instance of application server 111 that can interact with a plurality of user devices (e.g., user device $102_1$, ..., user device $102_N$) operated by various users presented to the cloud-based shared content environment 284 as instances of a registered user. Application server 111 can operate various instances of client services 104 associated with one or more enterprise accounts represented by enterprise account 206. The client services 104 can comprise, for example, a plurality of integrated applications (e.g., integrated application $203_1$, ..., integrated application $203_N$) associated with enterprise account 206. As can be observed, enterprise account 206 might have a corresponding enterprise database 238 to store various information pertaining to the enterprise. A developer at enterprise account 206 can also interact with a user device to manage the integrated applications and/or other information related to the enterprise.

The registered user authentication technique 2A00 further illustrates a portion of the data structures that can be used (e.g., communicated in messages between modules, devices, services and accounts) in implementing the herein disclosed techniques. Specifically, the enterprise account 206 can receive an enterprise identifier (e.g., a code) in the form of, or derived from, an enterprise credential or enterprise ID (e.g., EID 236). As an example, an EID can be assigned by an operator or IT person at the firm that operates the content management service. An integrated application identifier or IAID (e.g., IAID 243) uniquely associated with the integrated application $203_1$ can further be created. The enterprise account 206 can be associated with the integrated application $203_1$ by registering the integrated application using the EID and IAID. A data structure can store any number of IAIDs that are mapped (e.g., in a many-to-one relationship) to an EID. Strictly as one example, an EID-IAID relationship can be stored (e.g., registered) in one or more database tables in a services database 237.

When the integrated application $203_1$ is registered, the registered user at user device $102_1$ can login to the integrated application with a predefined (e.g., user-defined, or partially user-defined) set of user login codes (e.g., account number and PIN, or user's email alias and passcode) or other set of user credentials (e.g., see UC 232). If the user is a new user, integrated application $203_1$ will communicate with the API service 210 (e.g., the user creation module 214) to create a new registered user and assign a user identifier or user ID (e.g., UID) uniquely associated with the registered user. The UID can be mapped to user-specific authorized content in the provider-managed user information 184 in the services database 237.

To invoke authentication and authorization (e.g., using the authentication module 211 and the authorization module 212, respectively) for shared content and/or feature (e.g., API) access by the registered user facilitated by one or more access tokens, the integrated application $203_1$ will communicate with API service 210 using a message comprising at least a portion of the integrated application ID (e.g., IAID 243) and the user credentials (e.g., UC 232). For example, a message (e.g., service request, HTTP POST request) from integrated application $203_1$ to the API service 210 can comprise one or more JSON web token (JWT) objects representing an encoded JSON web signature (JWS). In some cases, the message can originate from a user device $102_1$ and be delivered directly to the API service 210 (e.g., bypassing the integrated application $203_1$). If the request and JWT objects are authenticated and authorized (e.g., by the authentication module 211 and the authorization module 212, respectively), the API service 210 can return an access token (e.g., enterprise access token, user access token, etc.) created and managed by the token generator 213 to establish a secure communications link between integrated application $203_1$ and API service 210. The secure link can be used to access authorized user content in one or more of the user workspaces.

In some embodiments, instances of the integrated application may implement or use portions of a predefined set of interface API code 233. Such interface API code can implement features pertaining to presentation and use of user interface screen devices (e.g., widgets) and/or such interface API code can implement prepackaged API call and callback code. Use of the predefined set of interface API code 233 facilitates rapid integration between the client environment 282 and API service 210 in cloud-based shared content environment 284. Further, use of the predefined set of interface API code 233 facilitates rapid implementation of a consistent regime for client user interfaces for accessing the content storage facility. In some cases, the predefined set of interface API code 233 can comprise a public API.

FIG. 2B presents an application user authentication technique 2B00 for accessing a cloud-based service platform that facilitates transactional access authentication. As an option, one or more instances of application user authentication technique 2B00 or any aspect thereof may be implemented in the context of the architecture and functionality of the embodiments described herein. The application user authentication technique 2B00 or any aspect thereof may be implemented in any desired environment.

The application user authentication technique 2B00 shown in FIG. 2B presents an example embodiment of various modules for implementing the herein disclosed techniques to facilitate cloud-based shared content access by an application user. The embodiment includes one or more instances of content management server 110 that can access the content storage facilities 112 in a cloud-based shared content environment 284. Functions of the modules can be accessed by an application programming interface (API) and/or an API call can invoke services (e.g., API services). Specifically, content management server 110 can operate an API service 210 comprising an authentication module 211, an authorization module 212, a token generator 213, and a user creation module 214. The content management server 110 can also operate a content management service 220 comprising content access applications to access a plurality of application user workspaces (e.g., application user workspace $224_1$, ..., application user workspace $224_N$). More specifically, the application user workspaces managed by content management service 220 represent secure collections of shared content 182 (e.g., stored on the content storage facilities 112) accessible by a respective application user. Content management service 220 uses the application user workspaces, in part, to deliver various layers of content management capabilities to the application users. Such content management capabilities include, but are not limited to, permissions and security, auditing and tracking, collaboration capabilities (e.g., commenting capabilities, task invocation capabilities, sharing capabilities, etc.), and other capabilities.

Client environment 282 includes a representative instance of application server 111 that can interact with a plurality of user devices (e.g., user device $102_1$, . . . , to user device $102_N$) operated by various users presented to the cloud-based shared content environment 284 as instances of an application user. Application server 111 can operate various instances of client services 104 associated with one or more enterprise accounts represented by enterprise account 206. The client services 104 can comprise, for example, a plurality of application services (e.g., application services $204_1$, . . . , application services $204_N$) associated with enterprise account 206 and/or other enterprises. As can be observed, enterprise account 206 might have a corresponding enterprise database 238 to store various information pertaining to the enterprise. A developer at enterprise account 206 can also interact with a user device to manage the application services and/or other information related to the enterprise.

The application user authentication technique 2B00 further illustrates a portion of the data structures that can be used (e.g., communicated in messages between modules, devices, services and accounts) in implementing the herein disclosed techniques. Specifically, the enterprise account 206 can receive an enterprise identifier (e.g., a code) in the form of, or derived from, an enterprise credential or enterprise ID (e.g., EID 236). An application service identifier or ASID (e.g., ASID 234) uniquely associated with the application service $204_1$ can further be created. The enterprise account 206 can be associated with the application service $204_1$ by registering the application service using the EID and ASID. A data structure can store any number of ASIDs that are mapped (e.g., in a many-to-one relationship) to an EID. Strictly as one example, an EID-ASID relationship can be stored (e.g., registered) in one or more database tables in a services database 237.

When the application service $204_1$ is registered, the user at user device $102_1$ represented as an application user (e.g., headless user) can login to the application service with a predefined (e.g., user-defined or partially user-defined) set of user login codes (e.g., account number and PIN, or user's email alias and passcode) or other set of user credentials (e.g., see UC 232). If the user is a new user, application service $204_1$ will communicate with the API service 210 (e.g., the user creation module 214) to create a new application user and assign an application user identifier or AID (e.g., AID 248) uniquely associated with the application user. The AID can be mapped to user-specific application-owned (e.g., associated with ASIDs) authorized content in the provider-managed user information 184 in the services database 237. The AID can further be mapped to certain user credentials (e.g., UC 232) in client-managed user information 186 stored in the enterprise database 238.

To invoke authentication and authorization (e.g., using the authentication module 211 and the authorization module 212, respectively) for shared content and/or feature (e.g., API) access by the application user facilitated by one or more access tokens, the application service $204_1$ will communicate with API service 210 using a message comprising at least a portion of the ASID (e.g., ASID 234) and the AID (e.g., AID 248). If the request is authenticated and authorized (e.g., by the authentication module 211 and the authorization module 212, respectively), the API service 210 can return an access token (e.g., enterprise access token, user access token, etc.) created and managed by the token generator 213 to establish a secure communications link between application service $204_1$ and API service 210. The secure link can be used to access authorized user-specific application-owned content in one or more of the application user workspaces.

Further details regarding general approaches to application service and/or application user authentication to facilitate shared content access are described in U.S. patent application Ser. No. 14/838,212 titled "ACCESSING A CLOUD-BASED SERVICE PLATFORM USING ENTERPRISE APPLICATION AUTHENTICATION", filed on Aug. 27, 2015, which is hereby incorporated by reference in its entirety.

FIG. 2C presents an automation user authentication technique 2C00 for accessing a cloud-based service platform that facilitates transactional access authentication. As an option, one or more instances of automation user authentication technique 2C00 or any aspect thereof may be implemented in the context of the architecture and functionality of the embodiments described herein. The automation user authentication technique 2C00 or any aspect thereof may be implemented in any desired environment.

The automation user authentication technique 2C00 shown in FIG. 2C presents an example embodiment of various modules for implementing the herein disclosed techniques to facilitate cloud-based shared content access by an automation user. The embodiment includes one or more instances of content management server 110 that can access the content storage facilities 112 in a cloud-based shared content environment 284. Functions of the modules can be accessed by an application programming interface (API) and/or an API call can invoke services (e.g., API services). Specifically, content management server 110 can operate an API service 210 comprising an authentication module 211, an authorization module 212, a token generator 213, and a user creation module 214. The content management server 110 can also operate a content management service 220 comprising content access applications to access a plurality of automation user workspaces (e.g., microservice workspaces $225_1$, . . . , microservice workspaces $225_N$). More specifically, the automation user workspaces managed by content management service 220 represent secure collections of shared content 182 (e.g., stored on the content storage facilities 112) accessible by a respective automation user. Content management service 220 uses the automation user workspaces, in part, to deliver various layers of content management capabilities to the automation users. Such content management capabilities include, but are not limited to, permissions and security, auditing and tracking, collaboration capabilities (e.g., commenting capabilities, task invocation capabilities, sharing capabilities, etc.), and other capabilities.

Also shown in a client environment 282 is a representative instance of application server 111 that can interact with a plurality of user devices (e.g., user device $102_1$, . . . , user device $102_N$) operated by various users presented to the cloud-based shared content environment 284 as instances of an automation user. Application server 111 can operate various instances of client services 104 associated with one or more enterprise accounts represented by enterprise account 206. The client services 104 can comprise, for example, a plurality of microservices associated with enterprise account 206. As can be observed, enterprise account 206 might have a corresponding enterprise database 238 to store various information pertaining to the enterprise. A developer at enterprise account 206 can also interact with a user device to manage the microservices and/or other information related to the enterprise.

The automation user authentication technique 2C00 further illustrates a portion of the data structures that can be used (e.g., communicated in messages between modules, devices, services and accounts) in implementing the herein disclosed techniques. Specifically, the enterprise account 206 can receive an enterprise identifier (e.g., a code) in the form of, or derived from, an enterprise credential or enterprise ID (e.g., EID 236). A microservice identifier or MSID (e.g., MSID 235) uniquely associated with a particular microservice 205$_1$ can be created. The enterprise account 206 can be associated with the microservice by registering the microservice using the EID and MSID. Since access requests invoked by the microservices are agnostic to user information (e.g., user is effectively unknown), registration can invoke the creation (e.g., at user creation module 214) of a new automation user with an automation user identifier (e.g., device identifier that indicates from which device the microservice is being accessed) or and AUID (e.g., AUID 249) that is uniquely associated with the microservice. Strictly as one example, an EID-MSID-AUID relationship can be stored (e.g., registered) in one or more database tables in a services database 237. Further, the AUID can be mapped to application-owned (e.g., associated with MSIDs, EIDs, etc.) content in the services database 237. In the case of access to outputs from a microservice, a limited access token can be generated. The limited access token can be generated even though no user-specific credentials are provided, and even though no user-specific content permissions are retrieved from the cloud-based shared content environment 284.

When the microservice 205$_1$ is registered, the user at user device 102$_1$ represented as an automation user (e.g., unknown user) can use to the microservice to indicate an intent to access certain content. In such cases, no or minimal information (e.g., non-personally identifiable information such as NPII 231) about the user is collected by the microservice 205$_1$. For example, no user information might be used in a transactional access scenario, such as a file preview. In some cases, certain attributes from NPII 231 pertaining to the initiating request (e.g., user device type, time of day, location, etc.) might be included in a set of request parameters 239 corresponding to the access request from microservice 205$_1$. For example, a transactional impersonation scenario for document annotation might collect some information (e.g., location, screen name, access timestamps, etc.) pertaining to the user. Such information pertaining to the user can be derived from any accessible information sources (e.g., cookies) other than information sources that can be accessed only after user authentication. In some cases, NPII 231 might be applied to a set of client-managed user information 186 in the enterprise database 238 to determine other parameters (e.g., user group, gender, age group, etc.) to include in the request parameters 239. As an example, such limited personalization might be used to watermark a previewed document with the first name of the previewer determined from the client-managed user information 186. Such request parameters might also be used to tailor the user experience.

To invoke authentication and authorization (e.g., using the authentication module 211 and the authorization module 212, respectively) for shared content and/or feature (e.g., API) access by the automation user facilitated by one or more access tokens, the microservice 205$_1$ will communicate with API service 210 using a message comprising at least a portion of the AUID (e.g., AUID 249) and no or certain instances of request parameters 239. In the case of the automation user, the microservice can be authorized merely against the enterprise that created the microservice (e.g., based on the enterprise of the microservice developer). Such authorization does not use an explicit enterprise and/or user authorization since the microservice is registered as associated with the enterprise. If the microservice and request is authenticated and authorized (e.g., by the authentication module 211 and the authorization module 212, respectively), the API service 210 can return an access token (e.g., enterprise access token, user access token, etc.) created and managed by the token generator 213 to establish a secure communications link between microservice 205$_1$ and API service 210. The secure link can be used to provide a limited-scope access token to permit access to authorized (e.g., application-owned) content. One possible technique to request and use a limited-scope access token is shown and described as pertains to FIG. 3.

Figure 3:
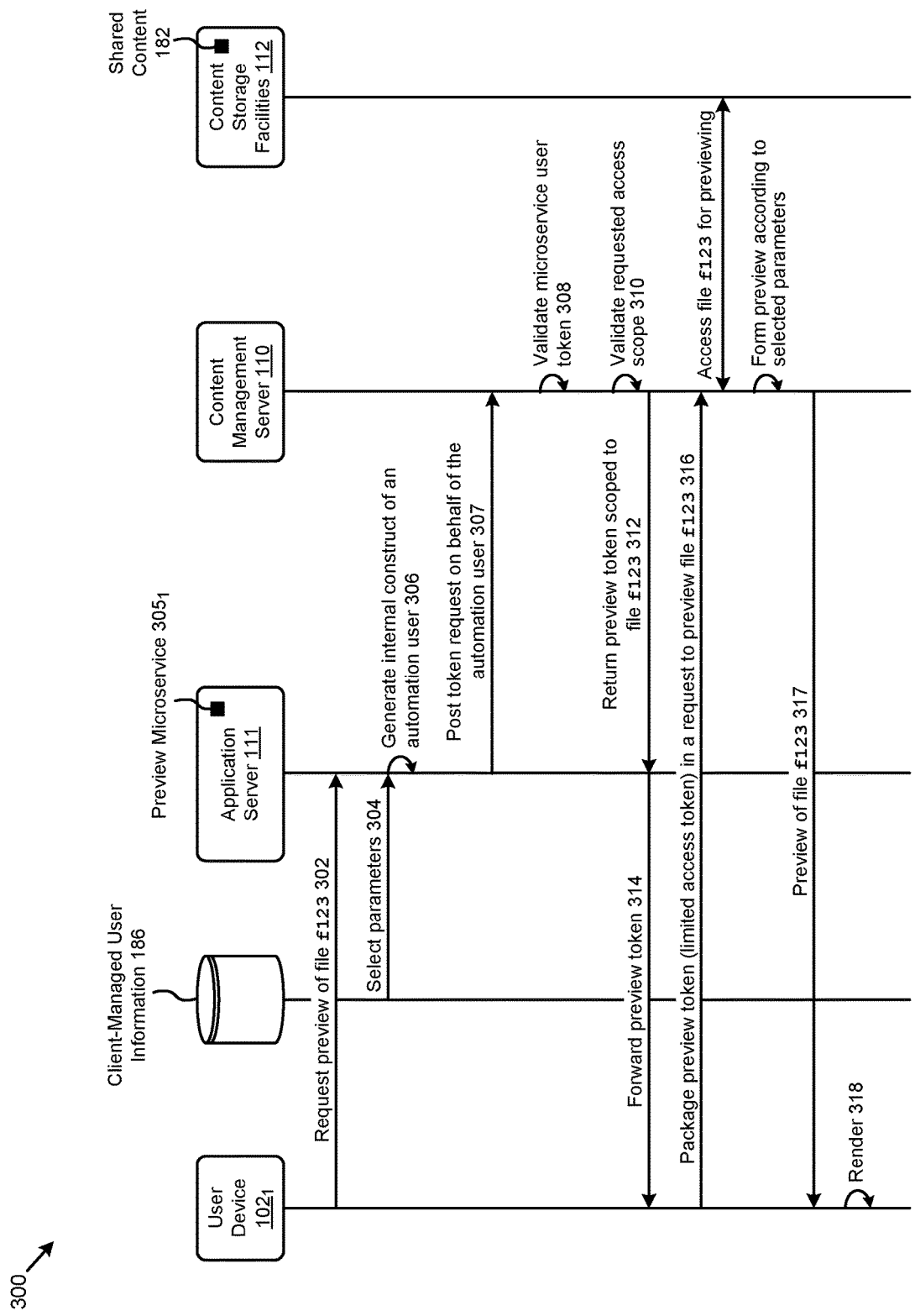
FIG. 3 depicts a limited-scope access token request technique as used in systems for facilitating transactional access authentication for cloud-based shared content, according to an embodiment.

FIG. 3 depicts a limited-scope access token request technique 300 as used in systems for facilitating transactional access authentication for cloud-based shared content. As an option, one or more variations of limited-scope access token request technique 300 or any aspect thereof may be implemented in the context of the architecture and functionality of the embodiments described herein. The limited-scope access token request technique 300 or any aspect thereof may be implemented in any environment.

In one embodiment, user device 102$_1$, application server 111, content management server 110, and the content storage facilities 112 can exhibit a set of high-level interactions (e.g., operations, messages, etc.) in the limited-scope access token request technique 300 for granting an access token for a limited scope content request (e.g., preview of one file from shared content 182) using the herein disclosed techniques. Specifically, the preview request for file f123 can be invoked from user device 102$_1$ (e.g., from a browser) and received at a preview microservice 305$_1$ at application server 111 (message 302). In some cases, certain parameters might be selected from client-managed user information 186 to, for example, improve the user experience (message 304). Using any or some of the parameters selected from client-managed user information, an internal construct forming an automation user is generated (operation 306), which in turn is used with a microservice invocation.

One example of a microservice invocation occurs when a user interface is configured to present a preview of a subject file. To accomplish this, the user interface invokes a microservice, which in turn requests access to the subject file and generates a preview (e.g., image) using the preview generator capabilities of the microservice. As shown, an access token request comprising an automation user token associated with preview microservice 305$_1$ can be posted to content management server 110 (message 307). For example, the post request might comprise the following parameters: a grant_type (e.g., describing client credentials), an optional client_id (e.g., identifying an API key of the microservice associated with the request), an app_access_token (e.g., access token of the microservice), a file_id (e.g., file identifier for the file to preview), and/or an expires_in indicator (e.g., time to expiry from the time of token generation). As an example, such posts might be submitted using any form of a post or URL structure, with responses issued in a JSON format.

The foregoing example includes preview generator capabilities of a microservice, however other microservice capabilities are possible. Strictly as examples, a microservice can perform all or portions of functions pertaining to watermarking (e.g., to embed a handle or other identity of the client), and/or virus scanning (e.g., so a client device can decide if it's protected or not, and/or a microservice can perform geo-location services (e.g., so as to identify an IP address or geographical location pertaining to the user) and/or to perform image recognition (e.g., to identify a person or place from an image), and/or for performing text summarization, etc. A microservice can specify a set of parameters that are defined so as to facilitate performance of the function or functions of the microservice.

Further details regarding general approaches to development of microservices for generation of previews and other content object representations as well approaches to development of other microservice capabilities are described in U.S. Provisional Patent Application Ser. No. 62/384,646 titled "GENERATION OF COLLATERAL OBJECT REPRESENTATIONS IN A WEB-BASED COLLABORATION ENVIRONMENT", filed on Sep. 7, 2016, which is hereby incorporated by reference in its entirety.

In most cases, such automation user tokens are discouraged or prevented from providing access scope to resources of the user device since the token can permit uploads, downloads, previews, and/or other operations on any content in the account associated with the microservice. As an example, a leak of an automation user token could possibly expose the full content of an account to an attacker until expiration and/or revocation of the token. To remediate such security risks, the automation user token and the requested access scope can use information stored at the content storage facilities beforehand so as to perform operation 308 and operation 310, which in turn results in return of a preview token that is scoped narrowly to merely permit limited access to the file f123 (message 312). The limited-scope token can then be forwarded to user device $102_1$ (message 314), which can in turn request retrieval of the preview asset (message 316). In certain variations, the content management server interacts with the content storage facilities, to access the file and form a preview that conforms to a set of given parameters. In some cases, in addition to the preview asset, certain sizing and/or resolution information and/or JavaScript code and/or other browser rendering assets can be forwarded to a user device to facilitate a preview of file f123 (message 317). The user device can then render the preview (operation 318).

Figure 4:
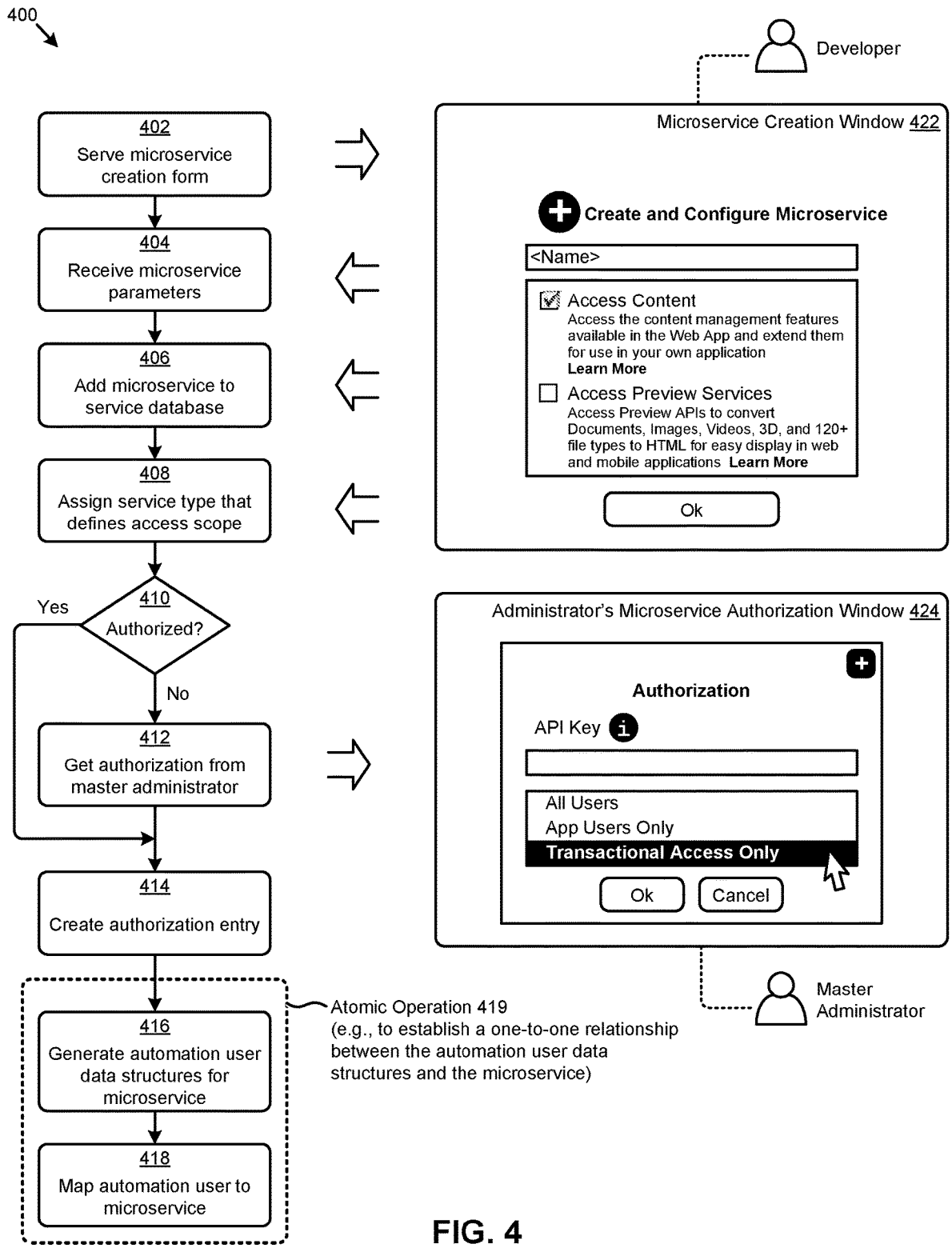
FIG. 4 illustrates a microservice creation technique as used in systems for facilitating transactional access authentication for cloud-based shared content, according to an embodiment.

FIG. 4 illustrates a microservice creation technique 400 as used in systems for facilitating transactional access authentication for cloud-based shared content. As an option, one or more variations of microservice creation technique 400 or any aspect thereof may be implemented in the context of the architecture and functionality of the embodiments described herein. The microservice creation technique 400 or any aspect thereof may be implemented in any environment.

The microservice creation technique 400 presents one embodiment of certain steps for creating a microservice (e.g., microservice application) that can be implemented in systems for facilitating transactional access authentication for cloud-based shared content. Specifically, the microservice creation technique 400 can commence with presenting a microservice creation form (e.g., microservice creation window 422) in a browser to a developer (step 402). Various parameters selected in the form pertaining to the microservice can be received (step 404). For example, microservice creation window 422 indicates such parameters might include a name and a microservice feature scope (e.g., content preview, content management features, etc.). When the developer clicks "Create and Configure Microservice", the microservice can be configured with respect to its selected access scope or scopes. Upon clicking "Ok", the microservice is added to a service database managed by the cloud-based service platform provider (step 406). For example, a row might be added to a database table associating the microservice with the scope granted to the microservice. Specifically, the scope might be codified in a column name service_type, where service_type=2 can refer to a microservice having a preview, upload, and download permissions (step 408). Other client services (e.g., integrated applications, application services, etc.) described herein might have other corresponding service_type settings. In some cases, other database table columns and/or bitmasks (e.g., user_type, can_call_view_api_only, app_users_type, etc.) might be used to determine the service_type setting.

In some cases, the developer may not be authorized to create a microservice application for the enterprise (see "No" path of decision 410). For example, a bitmask named "require_explicit_auth_for_microservice" that is associated with the enterprise can be controlled by one or more authorized enterprise administrators. Specifically, a master administrator can provide authorization using an interface rendered in a browser, such as is depicted in an administrator's microservice authorization window 424 (step 412). In some cases, the initially selected access level in the administrator's microservice authorization window 424 can be derived from the service_type of the microservice. For example, an AJAX request can be used to discover available access levels from the "API Key" entered and/or pre-loaded in the text box of administrator's microservice authorization window. Once authorized, an authorization entry (e.g., app_auth=app_only) associated with the enterprise and/or microservice can be created (step 414). Automation user data structures associated with the microservice can then be generated (step 416).

For example, the automation user can be stored in a user table at the cloud-based service provider. In most cases, no administrator permission assignments are associated with the automation user since such automation users represent a headless user or unknown user in the enterprise. In such cases, the automation user record is a record that belongs to the microservice as compared to a record that belongs to an individual end user (e.g., human user). The automation user can be mapped to the microservice in the service database in the cloud-based platform (step 418). A one-to-one relationship between the automation user account and the microservice is generated in a single atomic operation 419. Additionally, an automation user: (1) will automatically have an assigned root folder (e.g., with limited features), (2) cannot be collaborated into any other folders or groups in the enterprise, (3) cannot share content with any other user, (4) does not have a direct login, (5) cannot be accessed directly through the "/users" endpoint, (6) does not show up under the "Users" tab in the administrator console, and (7) cannot be deleted. In some embodiments, one or more of the foregoing steps can comprise an atomic database transaction.

Figure 5A:
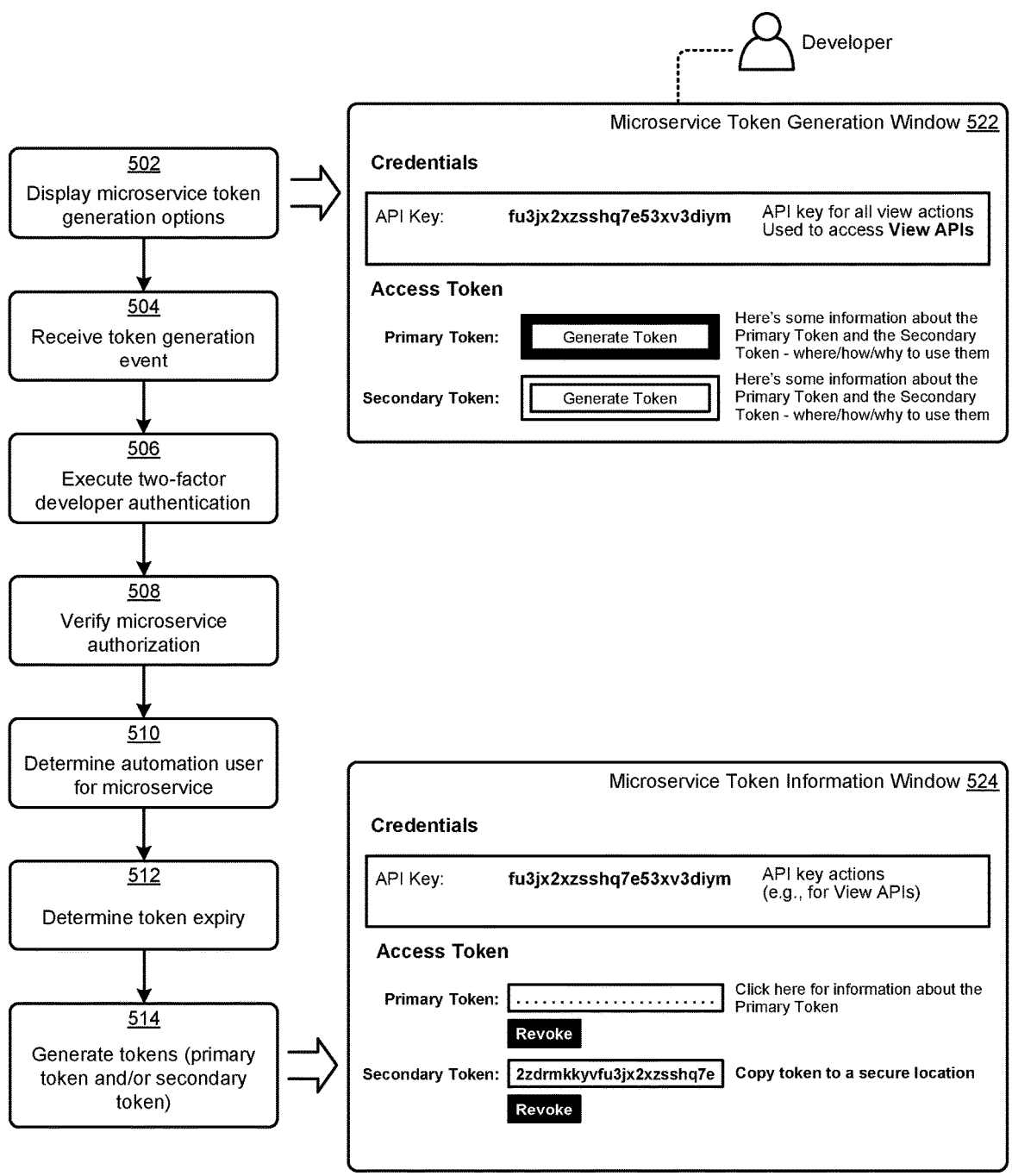
FIG. 5A depicts a token management technique as used in systems for facilitating transactional access authentication for cloud-based shared content, according to an embodiment.

FIG. 5A depicts a token management technique 5A00 as used in systems for facilitating transactional access authentication for cloud-based shared content. As an option, one or more variations of token management technique 5A00 or any aspect thereof may be implemented in the context of the architecture and functionality of the embodiments described herein. The token management technique 5A00 or any aspect thereof may be implemented in any environment.

The token management technique 5A00 presents one embodiment of certain steps for managing tokens (e.g., primary token, secondary token, etc.) used in systems for facilitating transactional access authentication for cloud-based shared content. According to the herein disclosed techniques, content accessed via a microservice is owned by the microservice such that user consent is not used or needed to generate access tokens. In such cases, token creation can be facilitated during a microservice creation and/or editing operation. In some embodiments, a primary access token and a secondary access token can be supported. A secondary access token, for example, can provide a developer access to backup credentials. Further, if a primary token is compromised, the developer can generate a secondary token to rollover (e.g., rotate out) the primary token (e.g., as shown and discussed in FIG. 5B). The token management technique 5A00 pertains to managing the foregoing tokens. Specifically, the token management technique 5A00 can commence with various microservice token generation options presented to a developer (step 502). For example, such options might be presented in a microservice token generation window 522 in a browser.

In this embodiment, generation of a microservice token is performed so as to provide the developer a key that can be used by any one or more APIs of the microservice. During execution of a microservice, every call to the one or more APIs will be checked to be sure that the call has been granted the needed set of permissions. Such permissions can be provided by the user/developer in the code base of the client service. To emulate granting of such permissions to an unauthenticated user, a token is generated and associated with the microservice or its constituent APIs or other calls. During execution, the generated token is used as a proxy that carries the semantics of the permissions/scopes that are needed to carry out the function of the microservice, which functions may include access to enterprise data. The token is specific to the microservice. It cannot serve as a general set of permissions that can be used in any context other than for execution of the microservice.

Using an interface such as the shown microservice token generation window 522 the token can be generated and then configured into the microservice. The generated token is coded into the microservice and then passed to the microservice caller such that an invocation of the microservice can be executed with the granted permissions/scopes to access its owned resources.

In this embodiment, a token generation event (e.g., invoked by clicking a "Generate Token" button) can be received (step 504) which in turn invokes the execution of a two-factor authentication (2FA) of the developer (step 506). The 2FA may not be invoked if the developer belongs to an SSO-required enterprise, or the 2FA or SSO facilities may not be used at all. When the developer is authenticated, authorization to perform certain microservice operations (e.g., create tokens) can be verified (step 508). In some cases, the developer can be validated as the developer of the microservice by checking a list of authorized developers of the microservice. This check prevents, for example, a malicious user from creating a token for a microservice that the user did not create by changing the service_id passed over the network. The automation user corresponding to the microservice can also be determined (step 510). The token expiry can be determined, for example, by converting an expiration time selected by the developer into an appropriate timestamp (step 512). Using the foregoing and/or other information, the primary or secondary (e.g., based on button clicked) token can be generated (step 514). For example, in some embodiments, the token can be generated by passing the foregoing parameters with various microservice attributes (e.g., identifiers, scope, permissions, features, etc.) to an OAuth2 token service. Marking a generated token as being a primary token or a secondary token can be performed using various techniques, such as through use of bitmasks or tests (e.g., is_primary_token), or through occurrence in secured token tables, or through use of a hash data structure containing token attributes (e.g., token_type= [0|1]), etc.

As shown in a microservice token information window 524, the plaintext access token will be displayed one time corresponding to the generation event. For further security, a refresh of the microservice token information window 524 will replace the token with asterisks. As also shown, any of the tokens can be revoked from the microservice token information window 524 by clicking a "Revoke" button associated with a given token. Responsive to clicking a "Revoke" button, the herein disclosed techniques can facilitate: (1) confirming the desire to revoke the token, (2) issuing a POST command comprising the service_id and primary or secondary tag information, (3) validating the current user (e.g., developer) is an authorized developer of the microservice, (4) retrieving the oauth2_access_token_id using the service_id and token_type, (5) validating the token is not expired, (6) deleting database table entries pertaining to the token, and (7) replacing the "Revoke" button with a "Generate Token" button.

Figure 5B:
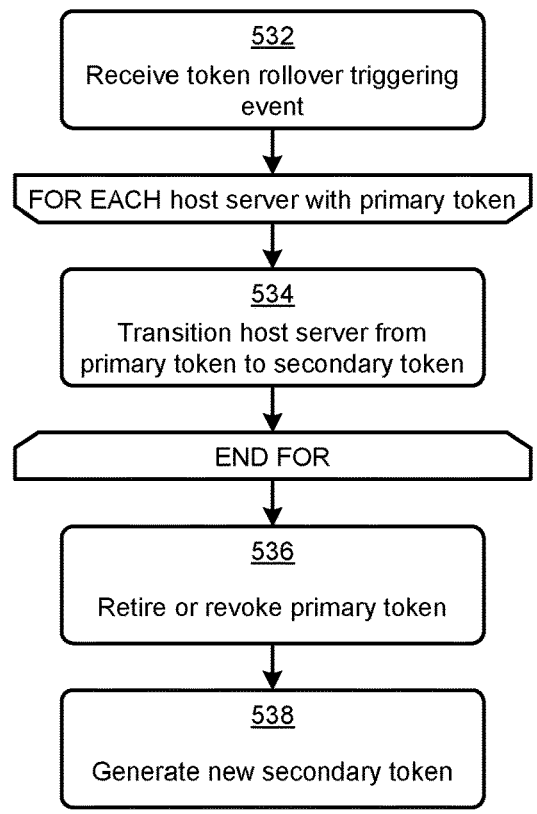
FIG. 5B depicts a token rollover technique as used in systems for facilitating transactional access authentication for cloud-based shared content, according to an embodiment.

FIG. 5B depicts a token rollover technique 5B00 as used in systems for facilitating transactional access authentication for cloud-based shared content. As an option, one or more variations of token rollover technique 5B00 or any aspect thereof may be implemented in the context of the architecture and functionality of the embodiments described herein. The token rollover technique 5B00 or any aspect thereof may be implemented in any environment.

The token rollover technique 5B00 presents one embodiment of certain steps for rolling over (e.g., rotating out) tokens used in systems for facilitating transactional access authentication for cloud-based shared content. For example, if a primary token is compromised, a developer can generate a secondary token to rollover to from the primary token (e.g., rotate out). Specifically, the token rollover technique 5B00 can commence with receiving a token rollover triggering event (step 532). For example, the rollover event might be manually triggered (e.g., by a developer) or automatically triggered (e.g., as part of a token management policy). For each host server with the subject token, such as a primary token, the host server can be transitioned from using the primary token to using the secondary token (step 534). At step 536, when all host servers have been transitioned, the primary token can be retired (e.g., due to an expiration) or revoked (e.g., due to the token being compromised). Since the former secondary token is now the current primary token, a secondary token can be generated in accordance with the aforementioned techniques for token generation (step 538).

System Architecture Overview

Additional System Architecture Examples

Figure 6A:
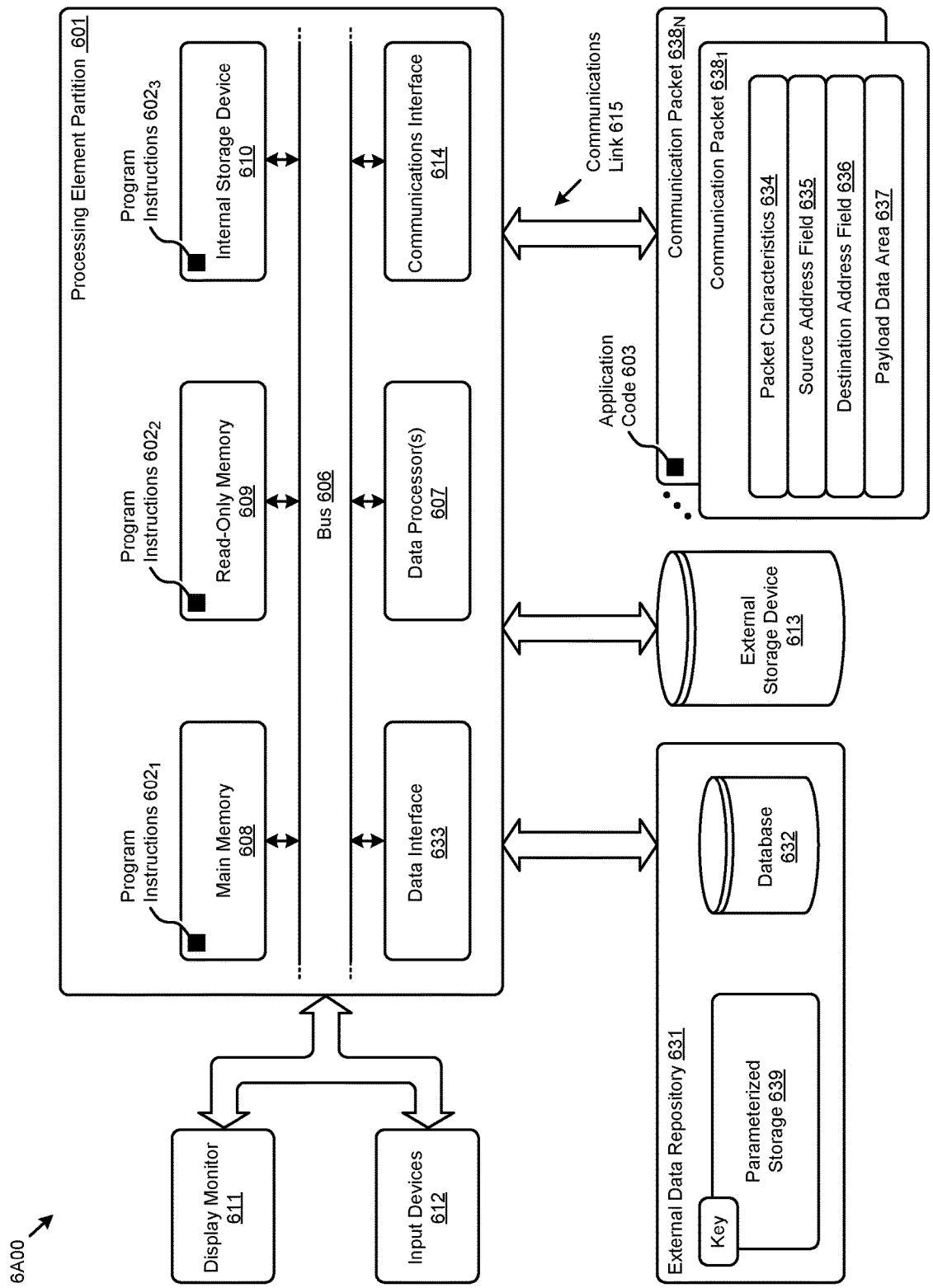
FIG. 6A and FIG. 6B present block diagrams of computer system architectures having components suitable for implementing embodiments of the present disclosure, and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601 however other partitions are possible. The shown computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of the communications interface 614 may comprise one or more networking ports that are configurable (e.g., pertaining to speed, protocol, physical layer characteristics, media access characteristics, etc.) and any particular instance of the communications interface 614 or port thereto can be configured differently from any other particular instance. Portions of a communication protocol can be carried out in whole or in part by any instance of the communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

The communications link 615 can be configured to transmit (e.g., send, receive, signal, etc.) any types of communications packets (e.g., communications packets $638_1$, . . . , communications packets $638_N$) comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of the computer system 6A00. According to certain embodiments of the disclosure, two or more instances of computer system 6A00 coupled by a communications link 615 (e.g., LAN, PTSN, or wireless network) may perform the sequence of instructions required to practice embodiments of the disclosure using two or more instances of components of computer system 6A00.

The computer system 6A00 may transmit and receive messages such as data and/or instructions organized into a data structure (e.g., communications packets). The data structure can include program instructions (e.g., application code 603), communicated through communications link 615 and communications interface 614. Received program code may be executed by data processor 607 as it is received and/or stored in the shown storage device, or in or upon any other non-volatile storage for later execution. Computer system 6A00 may communicate through a data interface 633 to a database 632 on an external data repository 631. Data items in a database can be accessed using a primary key (e.g., a relational database primary key).

The processing element partition 601 is merely one sample partition. Other partitions can include multiple data processors, and/or multiple communications interfaces, and/ or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). A module may include one or more state machines and/or combinational logic used to implement or facilitate the operational and/or performance characteristics pertaining to transactional access authentication for cloud-based shared content.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of performing transactional access authentication for cloud-based shared content). Such files or records can be brought into and/or stored in volatile or non-volatile memory.

Figure 6B:
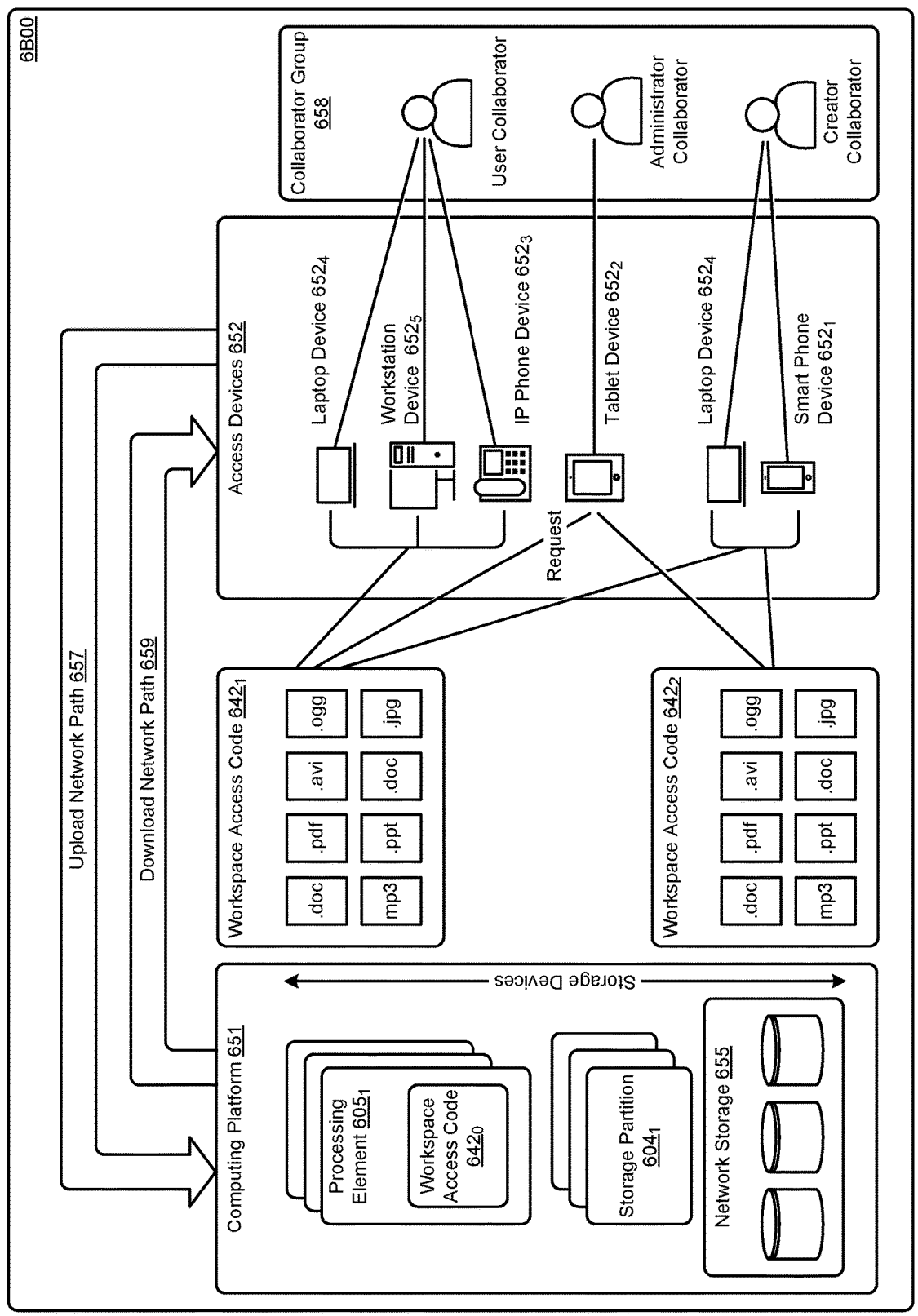

FIG. 6B depicts a block diagram of an instance of a cloud-based environment 6B00. Such a cloud-based environment supports access to workspaces through the execution of workspace access code (e.g., workspace access code $642_0$, workspace access code $642_1$, and workspace access code $642_2$). Workspace access code can be executed on any of the shown access devices 652 (e.g., laptop device $652_4$, workstation device $652_5$, IP phone device $652_3$, tablet device $652_2$, smart phone device $652_1$, etc.). A group of users can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices. Such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 651, including in a middleware setting. As shown, a portion of the workspace access code resides in and can be executed on one or more processing elements (e.g., processing element $605_1$). The workspace access code can interface with storage devices such as the shown networked storage 655. Storage of workspaces and/or any constituent files or objects, and/or any other code or scripts or data can be stored in any one or more storage partitions (e.g., storage partition $604_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

In many cases a workspace or portion thereof can be served by a processing element, where the processing element serves a user interface that supports access to storage devices that are accessible by the processing element. Display of, and handling of user interaction with such a user interface is implemented at least in part by workspace access code. The workspace access code in turn facilitates processing (e.g., possibly involving uploading of requests and any constituent parameters) of any combinations access requests that correspond to any combinations of the aforementioned three different access request types. Access requests of different access request types can be mixed and/or interleaved in any order.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
identifying a server in a cloud-based environment, wherein the server is configured to interface with one or more storage devices that store content objects; and
configuring the server to carry out a protocol between the server and a user interface that supports access to the one or more storage devices, the user interface being capable of processing three different access request types, wherein a first access request type of the three different access request types relates to an authenticated user, a second access request type relates to a first anonymous user using an authenticated application, and a third access request type relates to a second anonymous user using an authenticated service, wherein the user interface processes the three different access request types by:
processing the first access request type using a first credential of a first user accessing an application,
processing the second access request type by invoking the authenticated application from the user interface, wherein the first user is the first anonymous user, and
processing the third access request type based at least in part on at least a portion of an inherited user profile, wherein the inherited user profile corresponds to a second user that is different from the first user, wherein the first user is using the authenticated service as the second anonymous user.

2. The method of claim 1,
wherein the first access request type comprises a username and password pair of the first user to authorize a first access scope,
wherein the second access request type invokes the authenticated application to authorize a second access scope, and
wherein the third access request type invokes the authenticated service to authorize a third access scope, the authenticated service being a microservice.

3. The method of claim 2,
wherein the first access scope comprises access to at least a first set of files hosted on the server,
wherein the second access scope comprises access to a second set of files, wherein at least some of the second set of files are different from the first set of files, and
wherein the third access scope comprises access to a third set of files, wherein at least some of the third set of files are different from the first set of files and at least some of the third set of files are different from the second set of files.

4. The method of claim 2,
wherein the first access scope comprises user-owned content,
wherein the second access scope comprises application-produced content, and
wherein the third access scope comprises microservice-produced content.

5. The method of claim 2, wherein at least one of, the first access scope, the second access scope, or the third access scope, comprises at least one of, a set of content, or a set of APIs.

6. The method of claim 1, further comprising registering the authenticated application as being associated with an enterprise.

7. The method of claim 1, further comprising registering a service to be the authenticated service.

8. The method of claim 7, further comprising generating at least one token associated with the service.

9. The method of claim 8, wherein the at least one token is at least one of, a primary token, or a secondary token.

10. A computer program, embodied in a non-transitory computer readable medium, the non-transitory computer readable medium having stored thereon a sequence of instructions which, when stored in memory and executed by one or more processors causes the one or more processor to perform a set of acts, the set of acts comprising:
   identifying a server in a cloud-based environment, wherein the server is configured to interface with one or more storage devices that store content objects; and
   configuring the server to carry out a protocol between the server and a user interface that supports access to the one or more storage devices, the user interface being capable of processing three different access request types, wherein a first access request type of the three different access request types relates to an authenticated user, a second access request type relates to a first anonymous user using an authenticated application, and a third access request type relates to a second anonymous user using an authenticated service, wherein the user interface processes the three different access request types by:
      processing the first access request type using a first credential of a first user accessing an application,
      processing the second access request type by invoking the authenticated application from the user interface, wherein the first user is the first anonymous user, and
      processing the third access request type based at least in part on at least a portion of an inherited user profile, wherein the inherited user profile corresponds to a second user that is different from the first user, wherein the first user is using the authenticated service as the second anonymous user.

11. The non-transitory computer readable medium of claim 10,
   wherein the first access request type comprises a username and password pair of the first user to authorize a first access scope,
   wherein the second access request type invokes the authenticated application to authorize a second access scope, and
   wherein the third access request type invokes the authenticated service to authorize a third access scope, the authenticated service being a microservice.

12. The non-transitory computer readable medium of claim 11,
   wherein the first access scope comprises access to at least a first set of files hosted on the server,
   wherein the second access scope comprises access to a second set of files,
   wherein at least some of the second set of files are different from the first set of files, and
   wherein the third access scope comprises access to a third set of files, wherein at least some of the third set of files are different from the first set of files and at least some of the third set of files are different from the second set of files.

13. The non-transitory computer readable medium of claim 11,
   wherein the first access scope comprises user-owned content,
   wherein the second access scope comprises application-produced content, and
   wherein the third access scope comprises microservice-produced content.

14. The non-transitory computer readable medium of claim 11, wherein at least one of, the first access scope, the second access scope, or the third access scope, comprises at least one of, a set of content, or a set of APIs.

15. The non-transitory computer readable medium of claim 10, further comprising instructions which, when stored in memory and executed by the one or more processors causes the one or more processors to perform acts of registering the authenticated application as being associated with an enterprise.

16. The non-transitory computer readable medium of claim 10, further comprising instructions which, when stored in memory and executed by the one or more processors causes the one or more processors to perform acts of registering a service to be the authenticated service.

17. The non-transitory computer readable medium of claim 16, further comprising instructions which, when stored in memory and executed by the one or more processors causes the one or more processors to perform acts of generating at least one token associated with the service.

18. The non-transitory computer readable medium of claim 17, wherein the at least one token is at least one of, a primary token, or a secondary token.

19. A system comprising:
   a non-transitory storage medium having stored thereon a sequence of instructions; and
   one or more processors that execute the instructions to cause the one or more processors to perform a set of acts, the set of acts comprising,
      identifying a server in a cloud-based environment, wherein the server is configured to interface with one or more storage devices that store content objects; and
   configuring the server to carry out a protocol between the server and a user interface that supports access to the one or more storage devices, the user interface being capable of processing three different access request types, wherein a first access request type of the three different access request types relates to an authenticated user, a second access request type relates to a first anonymous user using an authenticated application, and a third access request type relates to a second anonymous user using an authenticated service, wherein the user interface processes the three different access request types by:
      processing the first access request type using a first credential of a first user accessing an application,
      processing the second access request type by invoking the authenticated application from the user interface, wherein the first user is the first anonymous user, and
      processing the third access request type based at least in part on at least a portion of an inherited user profile, wherein the inherited user profile corresponds to a second user that is different from the first user, wherein the first user is using the authenticated service as the second anonymous user.

20. The system of claim 19,
wherein the first access request type comprises a username and password pair of the first user to authorize a first access scope,
wherein the second access request type invokes the authenticated application to authorize a second access scope, and
wherein the third access request type invokes the authenticated service to authorize a third access scope, the authenticated service being a microservice.

21. The system of claim 20,
wherein the first access scope comprises access to at least a first set of files hosted on the server,
wherein the second access scope comprises access to a second set of files, wherein at least some of the second set of files are different from the first set of files, and
wherein the third access scope comprises access to a third set of files, wherein at least some of the third set of files are different from the first set of files and at least some of the third set of files are different from the second set of files.

\* \* \* \* \*